US006600480B2

(12) United States Patent
Natoli

(10) Patent No.: US 6,600,480 B2
(45) Date of Patent: *Jul. 29, 2003

(54) VIRTUAL REALITY KEYBOARD SYSTEM AND METHOD

(76) Inventor: Anthony James Francis Natoli, P.O. Box 579, Bethpage, NY (US) 11714-0579

( * ) Notice: Subject to any disclaimer, the term of this patent is extended or adjusted under 35 U.S.C. 154(b) by 0 days.

This patent is subject to a terminal disclaimer.

(21) Appl. No.: 10/144,404

(22) Filed: May 13, 2002

(65) Prior Publication Data

US 2002/0130844 A1 Sep. 19, 2002

Related U.S. Application Data

(63) Continuation of application No. 09/223,948, filed on Dec. 31, 1998, now Pat. No. 6,388,657.

(51) Int. Cl.[7] .................................................. G09G 5/00
(52) U.S. Cl. ........................ 345/168; 345/7; 345/8; 345/9; 345/146; 345/156; 345/158; 345/169; 345/170; 345/171; 345/172; 345/173
(58) Field of Search ................................. 345/168, 169, 345/170, 171, 172, 173, 146, 156, 158, 7, 8, 9

(56) References Cited

U.S. PATENT DOCUMENTS

| | | | |
|---|---|---|---|
| 4,988,981 A | 1/1991 | Zimmerman et al. | 340/709 |
| 5,105,375 A | 4/1992 | Lapeyre | 364/709.16 |
| 5,212,372 A | 5/1993 | Quick et al. | 235/472 |
| 5,457,454 A | 10/1995 | Sugano | 341/22 |
| 5,546,943 A | 8/1996 | Gould | 128/653.1 |
| 5,581,484 A | 12/1996 | Prince | 364/559 |
| 5,610,528 A | 3/1997 | Neely et al. | 324/660 |
| 5,781,913 A | 7/1998 | Felsenstein et al. | 707/501 |
| 5,806,079 A | 9/1998 | Rivette et al. | 707/512 |
| 5,977,935 A | 11/1999 | Yasukawa et al. | 345/8 |
| 6,037,882 A | 3/2000 | Levy | 341/20 |
| 6,058,397 A | 5/2000 | Barrus et al. | 707/104 |
| 6,061,064 A | 5/2000 | Reichlen | 345/418 |
| 6,081,271 A | 6/2000 | Bardon et al. | 345/419 |
| 6,215,417 B1 | 4/2001 | Krass et al. | 341/20 |
| 6,320,559 B1 | 11/2001 | Yasukawa et al. | 345/7 |
| 6,407,679 B1 | 6/2002 | Evans et al. | 341/20 |

OTHER PUBLICATIONS

F. Evans et al., "VType: Entering Text in a Virtual World", no publication date or data, available on the Internet at http://www.cs.sunysb.edu/~skiena/papers. html.
Postscript text of document entitled "vtype.dvi", p. 1 only, created Apr. 29, 1998, corresponding to F. Evans et al., "VType: Entering Text in a Virtual World".
Webpage entitled "Student Publications", printed on Feb. 12, 2002, available on the Internet at http://www.cs.trinity.edu/~gpitts/students.html.
Proceedings of the National Conference on Undergraduate Research 1997, Table of Contents for vol. 3, Mathematics and Engineering, pp. xvii–xx.
Proceedings of the National Conference on Undergraduate Research 1998, Table of Contents for vol. 3, Mathematics and Engineering, pp. v–vii.
Proceedings of the National Conference on Undergraduate Research 1999, Table of Contents for vol. 3, Mathematics and Engineering, pp. xvii–xx.

*Primary Examiner*—Richard Hjerpe
*Assistant Examiner*—Jean Lesperance
(74) *Attorney, Agent, or Firm*—Anthony J. Natoli

(57) ABSTRACT

A system and method implement a virtual reality (VR) keyboard generated in a display device viewable to a user, with the VR keyboard simulating a physical keyboard with keys and simulating the depression of a physical key on the physical keyboard indicating a key input. The system and method address numerous difficulties of physical and/or hardware-based input devices.

20 Claims, 28 Drawing Sheets

VIRTUAL REALITY KEYBOARD SYSTEM AND METHOD

CROSS-REFERENCE TO RELATED APPLICATIONS

The present application is a continuation of co-pending U.S. application Ser. No. 09/223,948, filed Dec. 31, 1998, now U.S. Pat. No. 6,388,657 B1, issued May 14, 2002, which is incorporated herein by reference.

BACKGROUND OF THE INVENTION

1. Field of the Invention

This disclosure relates generally to the field of virtual reality, and in particular to a system and method for performing keyboard inputs without a keyboard using virtual reality.

2. Description of Related Art

The development of graphic user interfaces (GUIs) employing, for example, "WINDOWS" software, menu-driven software, mouse devices, and touch screens, has reduced the need for keyboard and keypad entry and for typing to enter alphanumeric data and commands into a computer and/or other computing-based devices. Such GUIs thus allow users to enter data and commands visually using visually-based windows and screens, as opposed to tactilely through a keyboard and/or keypad. However, applications using such GUIs are thus beholden to the software and software programmers to provide comprehensive windows and menus. Often, a GUI prompts the users to input data and commands through a keyboard and/or keypad by generating an input window or pop-up data entry line. Accordingly, in some instances, keyboards and/or keypads are necessities for GUI-based computer interfaces.

In addition, voice recognition applications have been developed which recognize the voice and inflections of speech of users, to allow the user to enter data and commands orally, as opposed to tactilely through a keyboard and/or keypad to enter alphanumeric data and commands. However, natural language processing may not be 100% accurate, and high accuracy is often gained by providing a great amount of processing power, which may sacrifice the overall performance of the computer systems using such voice recognition. Furthermore, to provide high or perfect accuracy, such voice recognition applications typically allow or even require the user to proofread, edit, and correct mistakes through alphanumeric entry via a keyboard and/or a keypad. Accordingly, in some instances, keyboards and keypads are necessities for voice-recognition-based computer interfaces.

Computer-based devices typically require an input device, an output device, and a processor. Heretofore, computers have been made smaller, portable, handheld, and even wristwatch-sized. However, in order to provide alphanumeric inputs, keyboards and/or keypads have generally been requisite components. The reduction of size of such keyboards has been difficult, since a wide range of alphanumeric keys is typically required. For example, keyboards based on the Roman and/or English alphabet require at least 26 keys, and enhanced keyboards require over 90 keys for number, cursor arrows, a space bar, punctuation symbols, controls such as TAB and ESC, etc. To accommodate such keys, manufacturers may reduce the sizes of individual keys, which sacrifices ease of use by the user. In addition, keyboards/keypads have heretofore been primarily hardware-based, and so are susceptible to wear, damage, and theft.

One proposed solution to provide reduced size and/or portability includes the use of telephone-based keypads having about 10 or more keys, with some keys having letters thereupon, such as the 2 key having the letters A, B, and C, thus resembling a telephone keypad such as a dual tone multiple frequency (DTMF) telephone. Through judicious hardware and/or software implementations, a user may be able to enter entire words and sentences, with sufficient patience and practice.

Other proposed solutions include eliminating the keyboard/keypad and instead using a touchscreen with handwriting recognition, such as the alphanumeric entry system of the "PILOT" handheld device. However, handwriting recognition systems typically require training the user to input a set of predefined symbols representing alphanumeric characters instead of the actual alphanumeric characters. Accordingly, keyboards and the like have not be replaced with equivalent or better devices.

A need exists for a system and method for providing the versatility of a keyboard and/or keypad for alphanumeric entry without requiring a keyboard and/or keypad and without sacrificing the advantages of a keyboard and/or keypad for inputting a large range of data and/or commands.

Virtual reality (VR) applications have heretofore provided a rudimentary system, typically using a GUI, for manipulating representations of physical elements, such as virtual reality doors and elevators in virtual worlds. Typically implemented in software, such VR applications interface with headsets and gloves to respond to and to interpret the movements of the head and hands of the user as commands and control signals. Heretofore, such VR applications and VR worlds are GUI-based, and so do not provide the versatility of hardware-based, actual and physical keyboards and/or keypads.

SUMMARY OF THE INVENTION

It is recognized herein that a system and method for providing a virtual reality keyboard addresses solves numerous difficulties of input devices and provides many diverse advantages in use and applications.

A system and method are disclosed which receive a virtual reality (VR) glove position, which generate a corresponding key code from the VR glove position using a predetermined mapping, and which send the key code to an application program as a key input corresponding to a keyboard and/or keypad entry of data and/or a command. The system and method also generate a display representing the key input based on the VR glove position. The display of the key input may include, but is not limited to, a displayed in a VR headset of a VR representation of a VR keyboard indicating the key input.

BRIEF DESCRIPTION OF THE DRAWINGS

The features and advantages of the disclosed virtual reality keyboard system and method are readily apparent and are to be understood by referring to the following detailed description of the preferred embodiments of the present invention, taken in conjunction with the accompanying drawings, in which.

DESCRIPTION OF THE PREFERRED EMBODIMENTS

Figure 1:
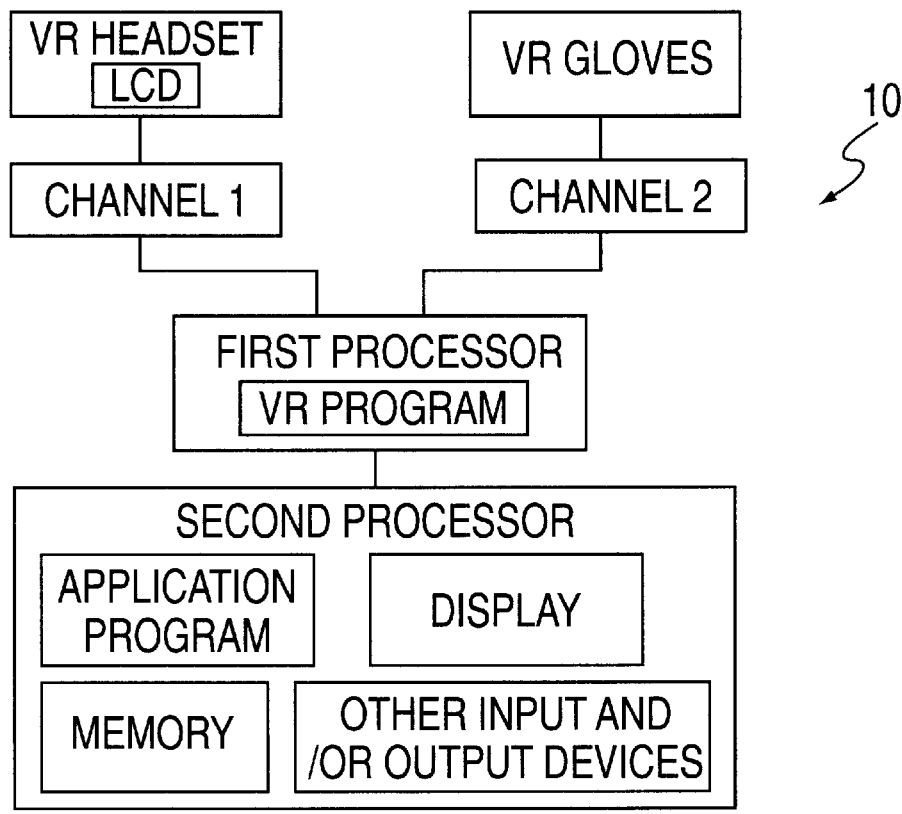
FIG. 1 illustrates a schematic of a first embodiment of the disclosed VR keyboard system and method.

Referring in specific detail to the drawings, with common reference numbers identifying similar or identical elements, steps, and features, as shown in FIG. 1, the present disclosure describes a system 10 and method for generating and operating a virtual reality (VR) keyboard 12. The term "keyboard" is defined herein to include alphanumeric keyboards, subsets of alphanumeric keyboards, keypads including numerical keypads, telephone and DTMF keypads, security access input devices using buttons with labels, etc., and so is not limited to QWERTY alphanumeric keyboards. Accordingly, it is understood that the use of the term "keyboard" and the depiction in any figures of a keyboard such as a QWERTY alphanumeric keyboard typically used with personal computers and the like is only an example of a keyboard for use, interaction, and operation by a user for any application of keyboards for input and/or output devices. As defined herein, the term "keyboard" is more than a plurality of keys, since a keyboard includes a layout of the plurality of keys as well as the keys, with the layout typically being predetermined. The keys may be associated with symbols such as alphabetical, numerical, mathematical, or other representations, and the keys may include associated pictorial or symbolic representations thereupon. Accordingly, a keyboard is not identical to a set of buttons, but may be a plurality of buttons having a layout and a set of symbols associated with each key or button.

The term "virtual reality" and its abbreviation "VR" are herein defined to include, but not to be limited to, visual and/or other sensory applications implemented using software and/or hardware to simulate and/or provide representations of environments which may be different from the physical environment of the user. Such VR may provide visual and/or multimedia zones, worlds, and work areas in which the user and/or other software applications may change and interact representations of elements in the VR environment. For example, in a VR world, a graphic representation of a switch may be changed to represent the flicking or switching of the switch, which may have an associated switch-flicking sound which is activated by flicking the switch. In addition, the VR switching of the VR switch may cause the actuation of other events, either in the VR world or in actual physical devices and structures; for example, the flicking of the VR switch may cause an actual computer to be turned on or off. Accordingly, the term "virtual reality" is not limited to simulations or representations of VR devices and information in VR worlds, but may also be extended to physical devices as well as, in hybrid implementations, to both physical and VR devices.

Figure 2:
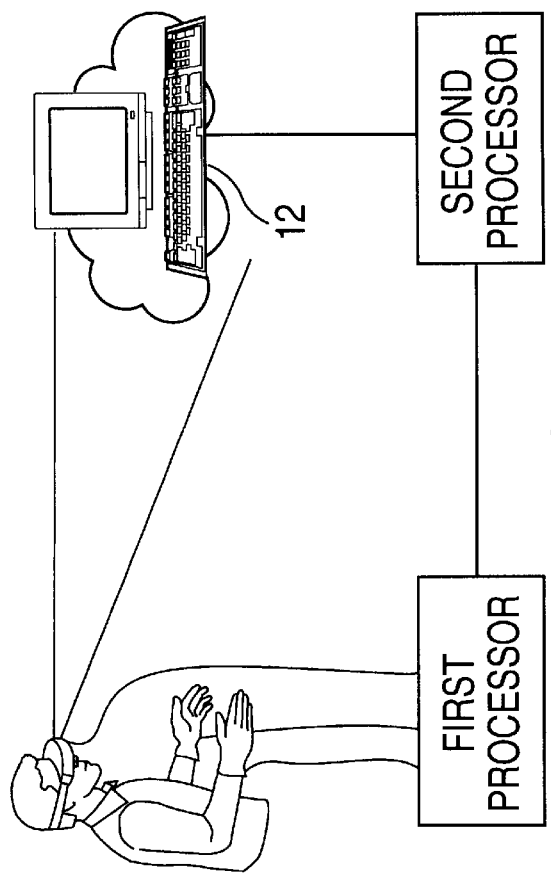
FIG. 2 illustrates the VR keyboard system and method of FIG. 1 in use by a user.

FIG. 1 illustrates a schematic of a first embodiment of the disclosed VR keyboard system and method, with the VR keyboard system including a VR headset known in the art to be worn or attached to a user, such that at least one display is visible to the user. For example, the display may be a liquid crystal display (LCD), known in the art, for generating images with depth and/or perspective to display a VR representation of a keyboard 12, as shown in FIG. 2, as well as VR worlds and environments. The LCD may be visible to one or both eyes and/or may be bifocal; that is, the user may view the VR world and/or keyboard by titling an eye in one direction toward the LCD, and may view the actual physical environment through the LCD by tilting an eye in another direction. The VR headset and/or LCD receive signals from a first processor through a first channel, which may be a wire, a wireless connection, a fiber optic, etc. The first processor is a VR processor which executes a VR program generated from source code in programming languages such as C++, "VISUAL BASIC", or Virtual Reality Mark-Up Language (VRML) to send VR images to the LCD and thence for viewing by the user. In addition or alternatively, the VR program may be at least one object in an object oriented programming language, which may be event-driven and/or which may poll input devices such as the VR glove to receive and process data to operate the VR keyboard.

The first processor may include a microprocessor such as a "PENTIUM" microprocessor with memory, such as about 16 MB of RAM for executing the VR program. The first processor may be a desktop personal computer (PC), a workstation, or a portable or laptop computer. For example, the first processor may be worn or mounted on the user; for example, on a belt about the waist of the user as the user wears the VR headset.

The disclosed VR keyboard system also includes at least one VR glove. In a preferred embodiment, two VR gloves are used to provide the user with full multi-hand functionality for VR keyboard inputs. However, one VR glove may be used for specific applications, such as numerical data entry and/or telephone number entry using a VR numerical keypad.

The VR glove is connected to the first processor through a second channel, which may be a wire, a wireless connection, a fiber optic, etc. for providing glove position signals to the first processor. The VR glove includes sensors for detecting the position and/or orientation of portions of the hand or hands of the user. As defined herein the term "position" of the VR glove refers to the direction and orientation of portions of the VR glove as well as a position, relative or absolute, of the VR glove and portions thereof as the VR glove is manipulated by the user, and also the configuration of the VR glove, including the aspects, bending, and lengths of the fingers of the user.

Some people do not consider the thumb to be included in the term "finger". However, as defined herein, the term "finger" with reference to the user and/or the VR glove includes the thumb; the index, middle, and ring fingers; the little or pinky finger; any digits of the hand and portions thereof; any or all toes; and other portions of the body, including portions of the body such as discreet and/or relatively obscured body parts not otherwise specified herein. One may chose to implement the disclosed VR keyboard system and method using muscle movements not limited to hand movements to enter alphanumeric data and commands through the VR keyboard. Accordingly, the term "finger" is not limited to any particular portion of the hand of the user.

The first processor generates key input signals such as key codes corresponding to the position of the VR glove to represent motions of the user to input alphanumeric data and/or commands through the VR keyboard. As defined herein, the term "alphanumeric" includes, but is not limited to, predetermined alphabets such as the English, Roman and/or Greek alphabets, predetermined number systems such as the Arabic number system, pictorial and/or pictographic languages such as the Japanese and Chinese languages, typographical systems, mathematical and chemical symbols, etc., and so is not limited to the symbols on a QWERTY keyboard. The key input signals are output to a second processor for use with application programs, including input and/or keyboard driver software, which reside in memory and which are executed by the second processor, for example, to receive and process input signals corresponding to the actuation of keys of a physical keyboard. In addition, the first processor may be incorporated within or be a component of the second processor.

In operating the application program, the second processor may display screens to implement, for example, graphic user interfaces (GUIs), as well as to receive and transmit other signals, for example, through other input and/or output devices, such as a mouse input, an actual keyboard, scanners, printers, modems, connections to networks such as the Internet, etc. For example, the application program may be the "ACCESS" database, the "EXCEL" spreadsheet, the "WORD" wordprocessor, the "INTERNET EXPLORER" Internet browser, the "MONEY" financial program, etc., all of such application programs being available from "MICROSOFT CORPORATION". Such application programs are capable of receiving inputs corresponding to keyboard inputs, and generate outputs which may be displayed on a display, including a computer monitor and/or the LCD of a VR headset. Accordingly, display signals generated by the second processor may be transferred through the first processor to the LCD of the VR headset.

FIG. 2 illustrates the VR keyboard system and method of FIG. 1 in use by a user, with the user operating the VR gloves, connected to the first processor, to manipulate the VR keyboard in the view of the user. The display may be an actual display device connected to the second processor and/or may be a VR representation of a display screen. The VR keyboard may be superimposed in the view of the user to appear in the region of space near or in front of the display, so that the user has the perception of viewing the VR keyboard as an actual keyboard for operation with the display displaying screens such as a GUI for operating the application program. In addition, the VR keyboard system and method may generate the VR display to also be superimposed over the actual display, so that the VR display may complement the actual display and the operation of the application program displayed on the actual display. The VR display may display the application program or other programs operating concurrently, for example, secondary windows of a GUI relative to primary windows displayed by the actual display.

Figure 3:
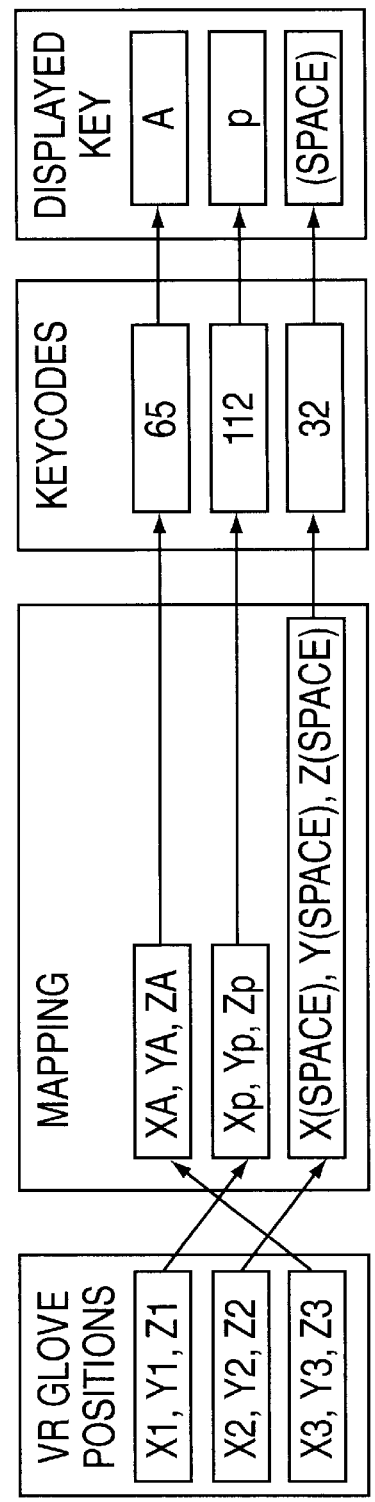
FIG. 3 illustrates a mapping of the VR glove positions to keycodes and displayed keys.

FIG. 3 illustrates a mapping of the VR glove positions to keycodes and displayed keys, with the VR glove positions, such as vector, radial, or cylindrical coordinates, being mapped to a predetermined mapping of key positions or coordinates, which are in turn mapped to keycodes, which may be ASCII codes or signals for use by a device for generating a specific keystroke of a keyboard. The key codes are then mapped to correspond to a displayed key and/or symbol. For example, the VR glove position or coordinates (X3, Y3, Z3) correspond to the positions or coordinates (XA, YA, ZA) in VR on the VR keyboard to provide depth and/or perspective in the screen representation of the VR world. In displaying the VR world and the VR keyboard, the first processor may convert the VR coordinates (XA, YA, ZA) to corresponding two dimensional screen coordinates for display while providing associated depth and/or perspective.

The VR coordinates (XA, YA, ZA) in turn correspond, for example, to an ASCII value 65 which is used to display a capital letter "A", in the Roman alphabet. As shown in FIG. 2, other glove positions may correspond to other letters such as lower case "p", as well as control codes such as an ASCII space labelled (SPACE) and other control signals such as the Escape (ESC) key, the Control (CTRL) key, number keys, the Scroll Lock key, etc. on computer keyboards.

Figure 4:
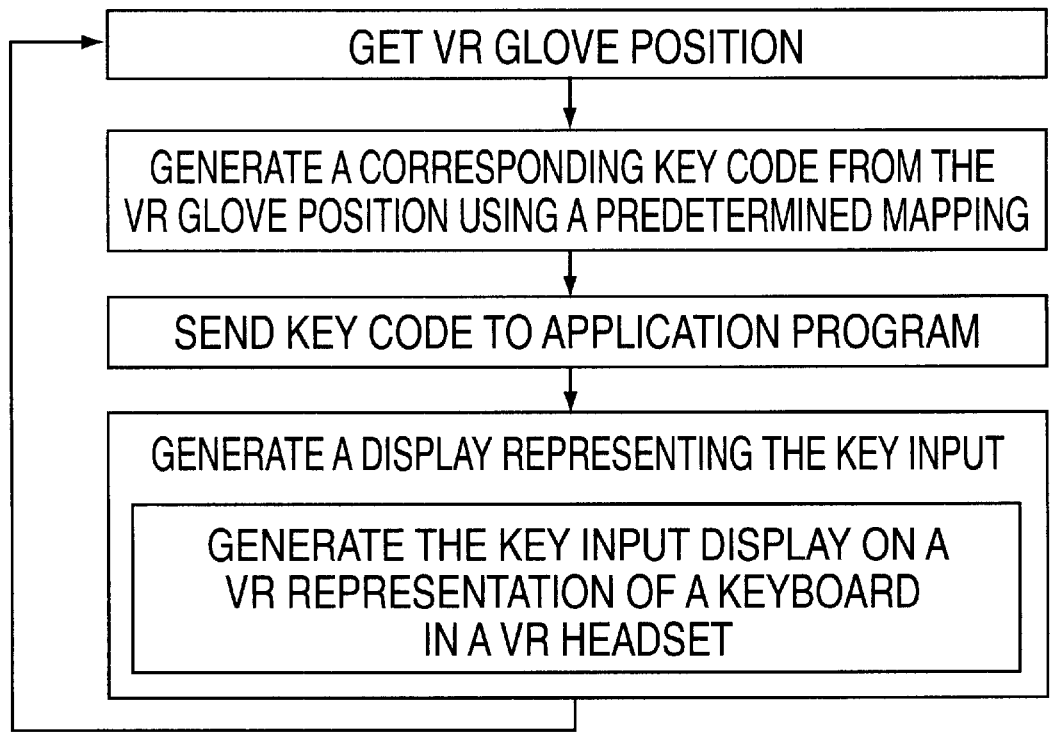
FIG. 4 illustrates a flowchart of the method of operation of the VR keyboard system and method of FIG. 1.

FIG. 4 illustrates a flowchart of the method of operation of the VR keyboard system of FIG. 1. The VR keyboard system and method may display a VR representation of a keyboard as the VR keyboard to the user through the VR headset, and the user may then move the VR glove to press the VR keys on the VR keyboard. The VR keyboard system and method get a VR glove position corresponding to the motions of the user to press the VR keys. The VR glove position may be obtained either passively by receiving VR glove position data, including using event-driven data acquisition software, or actively by polling the VR glove for position data at intervals, which may be periodic, regular, or irregular. The VR keyboard system and method then generates a corresponding key code from the VR glove position using a predetermined mapping, such as shown, for example, in FIG. 3.

The method has the first processor send the key code as a corresponding key input signal to the application program and/or to the input or keyboard driver software; for example, in the same manner as though an actual keyboard had generated and sent a key input signal to the application program or keyboard driver software in response to actuation of a physical key by the user. The application program processes the key input signal to perform appropriate and/or corresponding tasks, such as receiving input numerical data and performing number crunching data display.

The method then generates a display representing the key input; for example, a VR display generated in the VR headset may be changed to represent a VR representation of the key input such as a simulation of a corresponding key being depressed, with such a VR representation being sent to the VR headset for display to the user. Accordingly, as the user inputs data by depressing VR keys in the VR world having a VR keyboard being displayed to the user, corresponding key inputs are applied to the application program, and the actions of the user are displayed to the user as VR representations of the user pressing the VR keys.

The method may then loop back to get additional VR glove positions. In addition or alternatively, the method may perform the steps of FIG. 2 concurrently, for example, in a pipelined and/or parallel processing manner to respond to VR glove positions to actuate VR keys and to update the VR representation of the VR keyboard.

Accordingly, the user may operate and interact with the application program without the need for an actual physical keyboard. Since the VR keyboard may be implemented in software using the VR program, and the VR headset and VR gloves are employed, the VR program may be configured to provide VR keyboards of any size, any layout, and any character set, and so are not limited to a fixed physical and often unalterable keyboard. In addition, the VR keyboard may be utilized repeatedly without the concerns of wear on physical components. The VR program may be readily copied and backed up, within the legal limitations of copyright and other applicable rights. The various hardware components of the VR keyboard system 10 may be replaced and/or repaired as necessary to address wear and tear. In addition, such VR gloves and VR headsets may be relatively compact compared to the typical physical keyboard spanning about 18 inches (45 cm.) across. Accordingly, the disclosed VR keyboard system and method are applicable to laptop and handheld computing devices. In addition, although the VR keyboard system and method may operate using the VR headset in conjunction with a display associated with the second processor, the display of the VR headset may be used instead of the separate display or monitor.

In addition, devices referred to as network computers (NCs) purport to provide computing capabilities without the need for large amounts or even any hard drive and/or local memory. Instead, such NCs provide a display, an input device, and an interface to a network which remotely operates application programs in remote memory. Using the VR keyboard system and method, the first processor may act as an NC without a physical keyboard and optionally without the physical display separate from the LCD of the VR headset. Accordingly, the first processor may include network interface software and/or hardware to connect the VR keyboard system and method to a network, such as the Internet and the World Wide Web, to operate application programs remotely using the VR keyboard. In addition, such remote applications of the disclosed VR keyboard system and method may be used to control appliances and devices remotely, in situations in which such appliances and devices require some alphanumeric input. For example, one may set a programmable video cassette recorder (VCR) or the thermostat of a house using application software adapted to respond to such alphanumeric inputs provided remotely from the disclosed VR keyboard system and method.

Furthermore, since the VR keyboard system and method relies on relative VR glove positions, orientations, and configurations, the VR keyboard system and method may be used with the user oriented in any position, including lying down, at any angular position relative to any frame of reference, and even upside down. In addition, the use of the VR keyboard may be performed by the user moving the fingers and hands thereof in any comfortable manner. Accordingly, carpal tunnel syndrome may be reduced or even eliminated, since the user is not required to rest the wrists on a physical surface or to orient the arms in any fixed orientation in order to actuate the VR keyboard.

Moreover, the VR keyboard system and method is not gravity-dependent or pressure-dependent to provide a VR keyboard to the user. Accordingly, the disclosed VR keyboard system and method may be used in low-gravity or zero-gravity environments such as in outer space in space stations, space vehicles, lunar or Mars landing craft or bases, etc., as well as underwater, in bathyspheres, in air balloons such as high altitude balloons, and other environments with high or low ambient pressure such as air pressure and water pressure.

Figure 5:
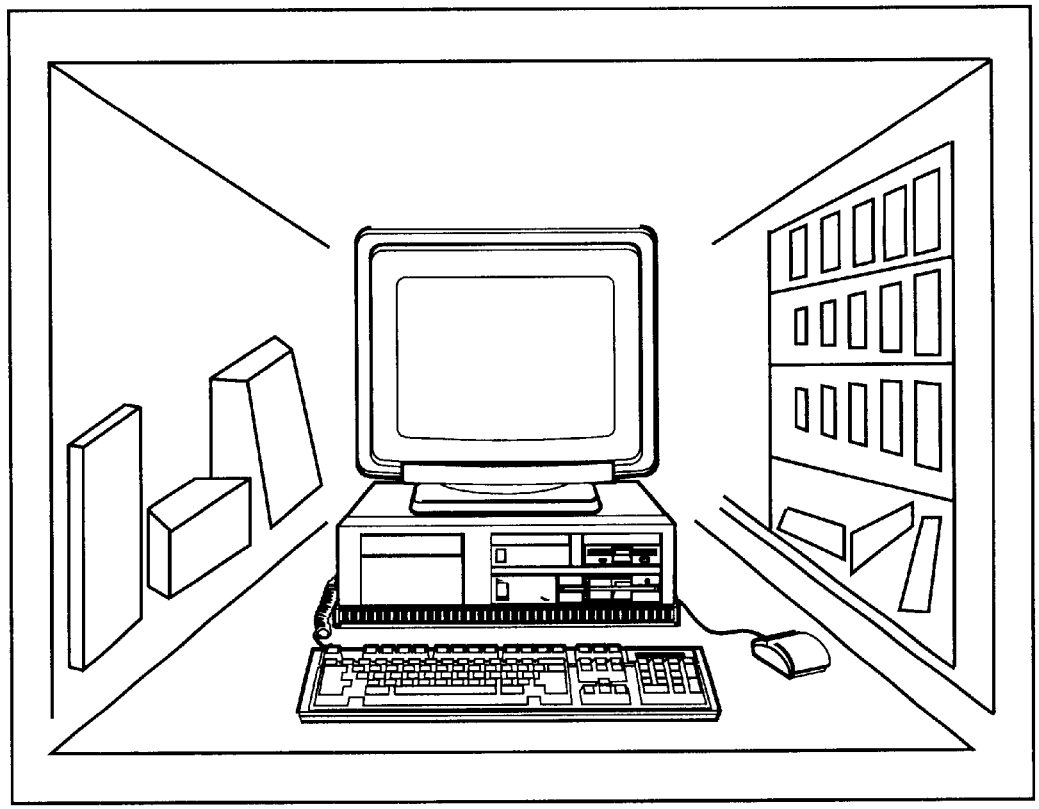
FIG. 5 illustrates the VR keyboard system and method having a VR world displaying the VR keyboard.

FIG. 5 illustrates the VR keyboard system and method having a VR world displaying the VR keyboard. The VR world may be displayed on the LCD of the VR headset to provide a VR office setting and/or a VR desktop with a VR representation of a computer monitor/display and a VR mouse on a VR desk. The VR world may also include a VR bookcase for accessing information indexed through VR books, which may actuate databases associated with the application programs and/or the second processor. A VR stereo system may be provided for accessing a VR tuner and/or VR media players to activate actual media players implemented in hardware and/or software associated with the application programs and/or the second processor.

Figure 6:
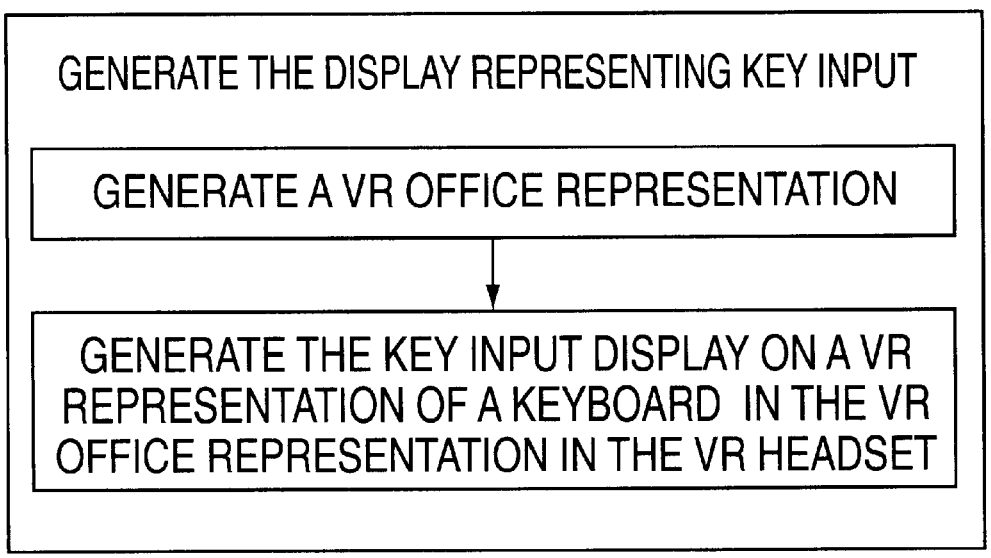
FIG. 6 illustrates a flowchart for operating the VR keyboard with the VR world of FIG. 5.

FIG. 6 illustrates a flowchart for operating the VR keyboard with the VR world of FIG. 5, in which the step of generating the display representing a key input includes the steps of generating the VR world representations, and generating the key input display on the VR representation of the VR keyboard in the VR world representation in the LCD of the VR headset.

Figure 7:
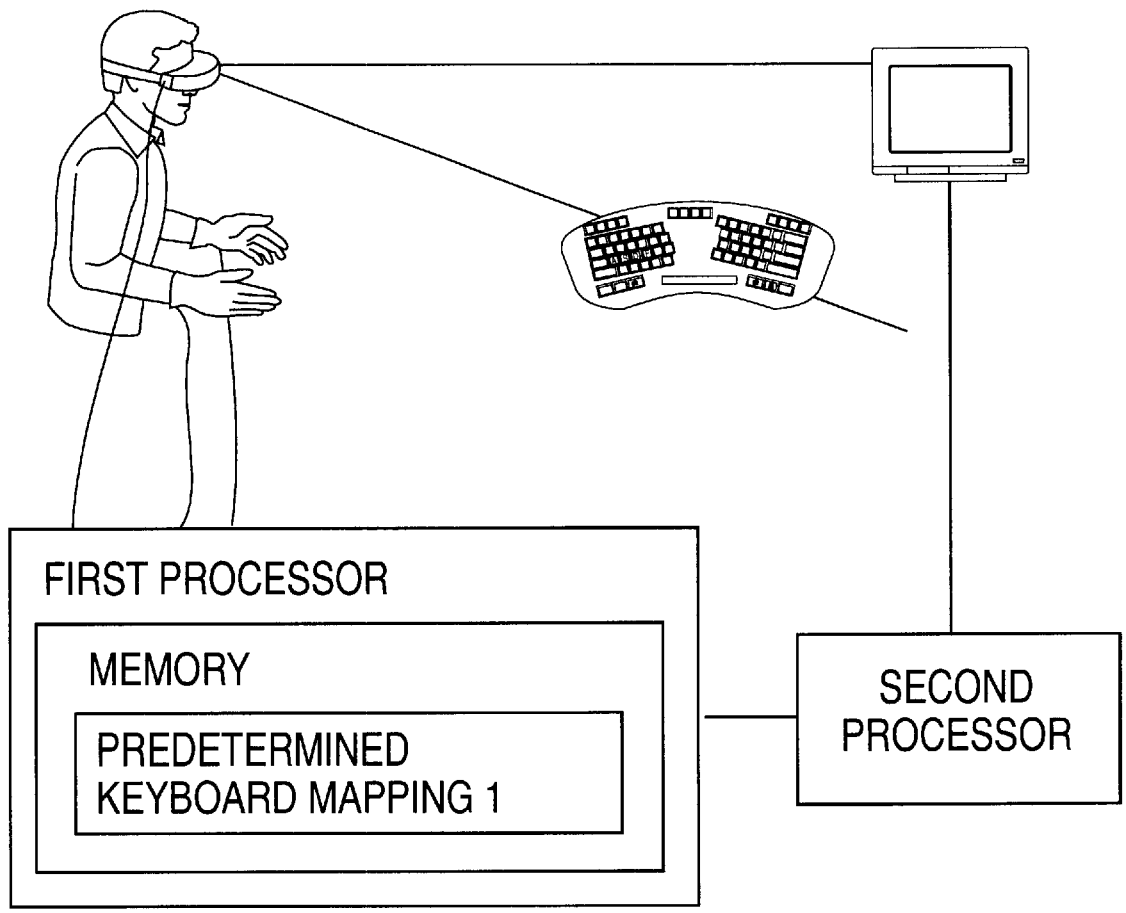
FIG. 7 illustrates a second embodiment of the VR keyboard system and method using different keyboard mappings to provide different VR keyboards.

FIG. 7 illustrates a second embodiment of the VR keyboard system and method using different keyboard mappings to provide different VR keyboards, such as an ergonomic or butterfly-shaped keyboard, which stores in memory and uses at least one predetermined keyboard mapping.

Figure 8:
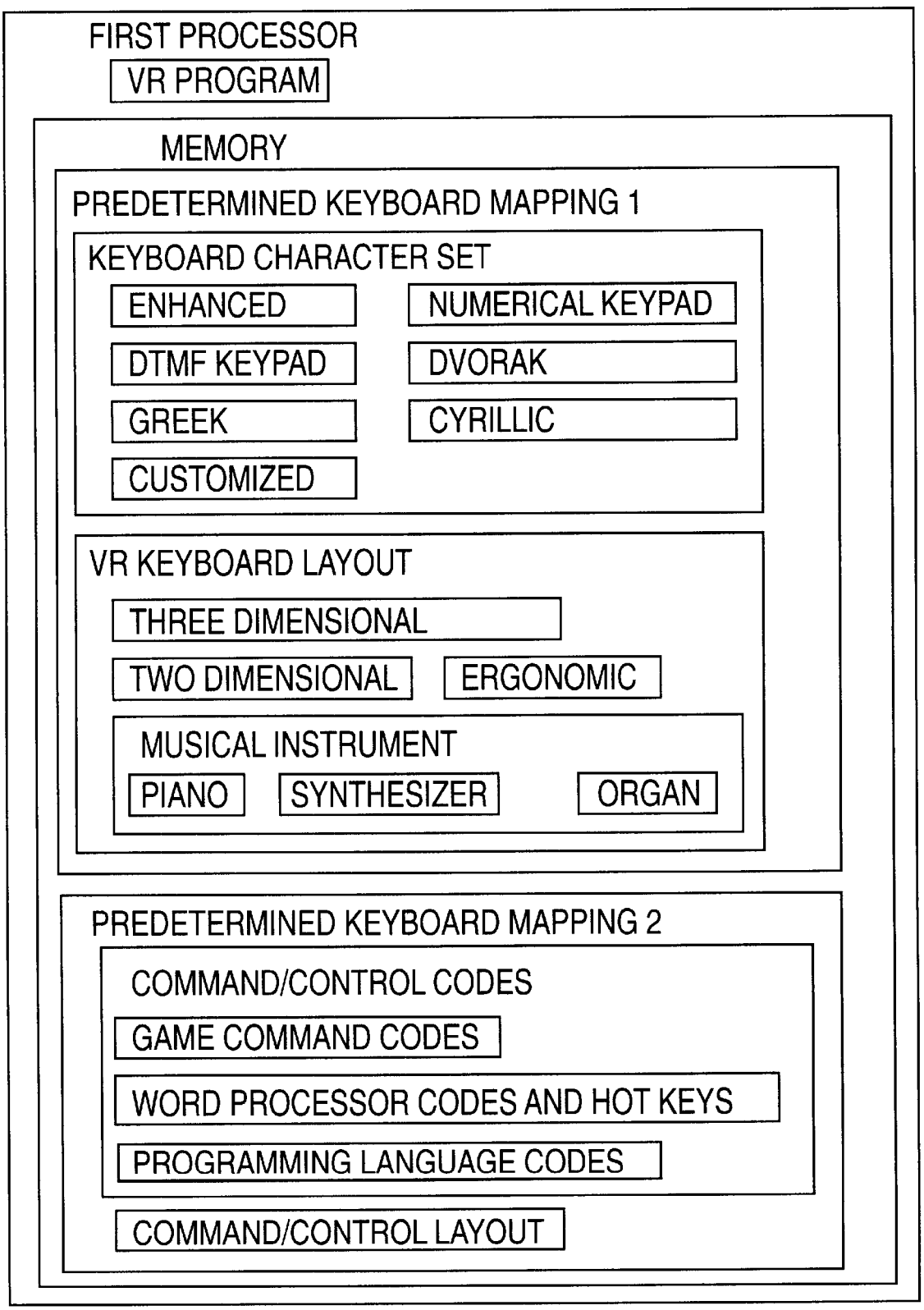
FIG. 8 illustrates a schematic of the second embodiment of FIG. 7 for implementing different VR keyboards.

FIG. 8 illustrates a schematic of the second embodiment of FIG. 7 for implementing different VR keyboards, in which a first predetermined keyboard mapping may include a keyboard character set such as for an enhanced keyboard, a numerical keypad, a DTMF keypad, a Dvorak keyboard, a Greek or Cyrillic alphabet character set, customized and user-customizable character sets, Chinese and other pictographic language character sets, and other sets of symbols such as mathematical symbols.

The first predetermined keyboard mapping may include VR keyboard layouts, such as data specifying a three dimensional keyboard, a two dimensional keyboard, an ergonomic keyboard layout, and even musical instrument key layouts for implementing VR representations of a piano, a music synthesizer, an organ, etc. Additional predetermined keyboard mappings may also be stored for implementing VR keyboards with command/control codes to control game command codes, word processor codes and hot keys, programming language codes such as assembly language mnemonics, etc. The second predetermined keyboard mapping may also include a command/control layout for configuring the positioning of such command/control code keys.

Figure 9:
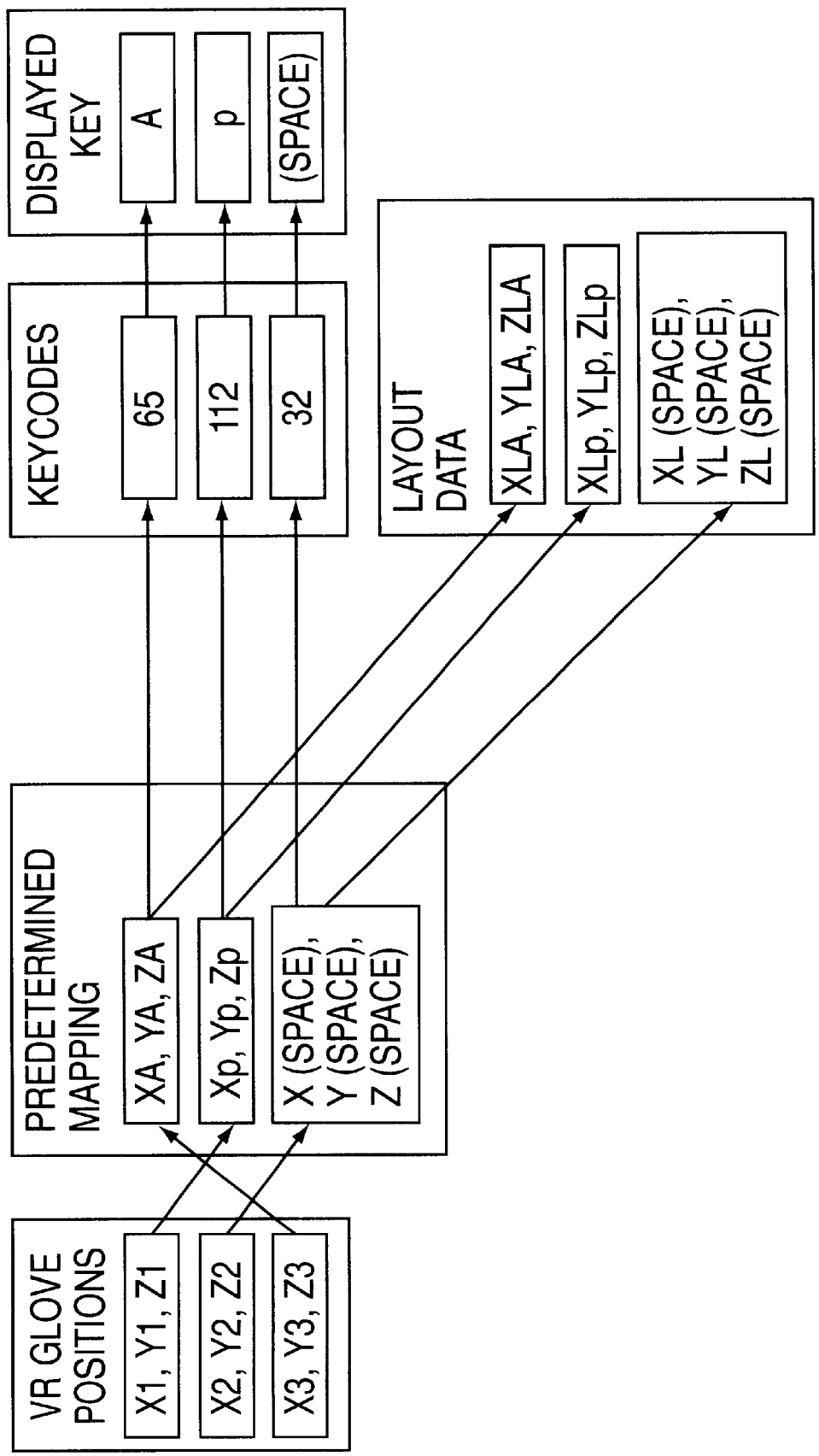
FIG. 9 illustrates a mapping used by the second embodiment to implement different VR keyboards with different character sets and layouts.

FIG. 9 illustrates a mapping used by the second embodiment to implement different VR keyboards with different character sets and layouts, in which the VR glove positions are mapped to a predetermined mapping, which then maps to corresponding keyboards and layout data. The keycodes are used to determine the displayed keys actuated by the user through the VR glove, and the layout data specifies where, within the VR representation of the VR keyboard and in the LCD of the VR headset, to display the actuated VR keys. For example, the glove position (X3, Y3, Z3) maps to a VR glove position (XA, YA, ZA) for a capital "A". The keycode 65 is then generated to display an "A", and the layout data (XLA, YLA, ZLA) determines how and where in the VR representation the displayed "A" is to be shown. The layout data may also include other features, such as perspective, shading, color changes, etc., to indicate to the user that the VR key has been actuated or "depressed" by the user through the VR glove interacting with the VR keyboard.

Figure 10:
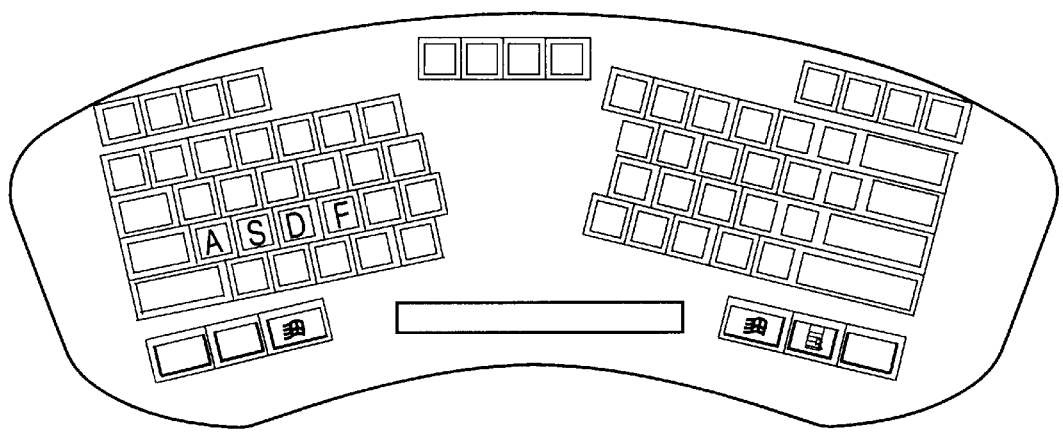
FIG. 10 illustrates a VR keyboard with an ergonomic layout.
Figure 11:
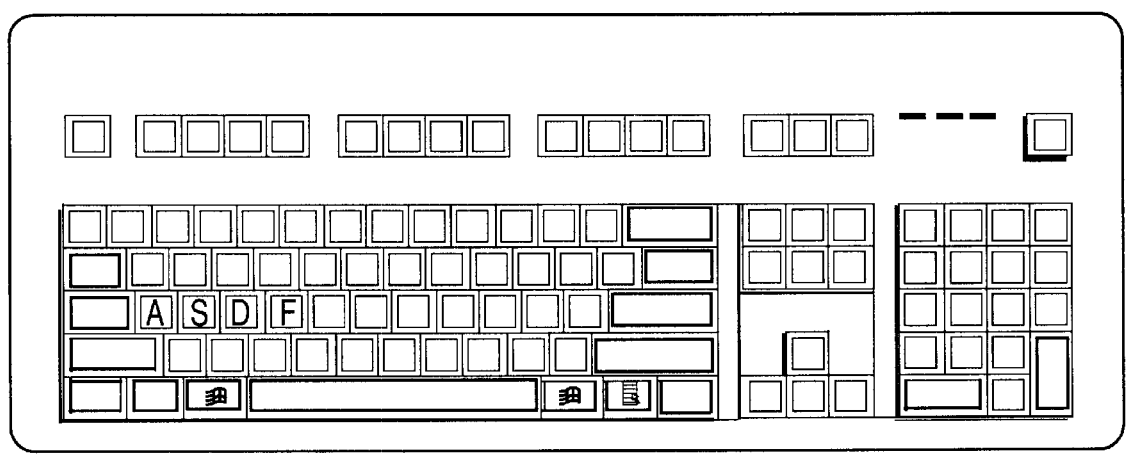
FIG. 11 illustrates a VR keyboard having special function keys.

FIG. 10 illustrates a VR keyboard with an ergonomic layout, which may provide a more relaxed orientation for use by the user to input data and/or commands. FIG. 11 illustrates a VR keyboard including additional special function keys, such as a "WINDOWS START BUTTON" key, a "WINDOWS" menu pointer key, etc., such as those keys found on 105+ keyboards for use with "WINDOWS 95" available from "MICROSOFT CORPORATION". Other special function keys may include TRANSMIT and KWIC used on keyboard interfaces for accessing the "WESTLAW" legal database.

Figure 12:
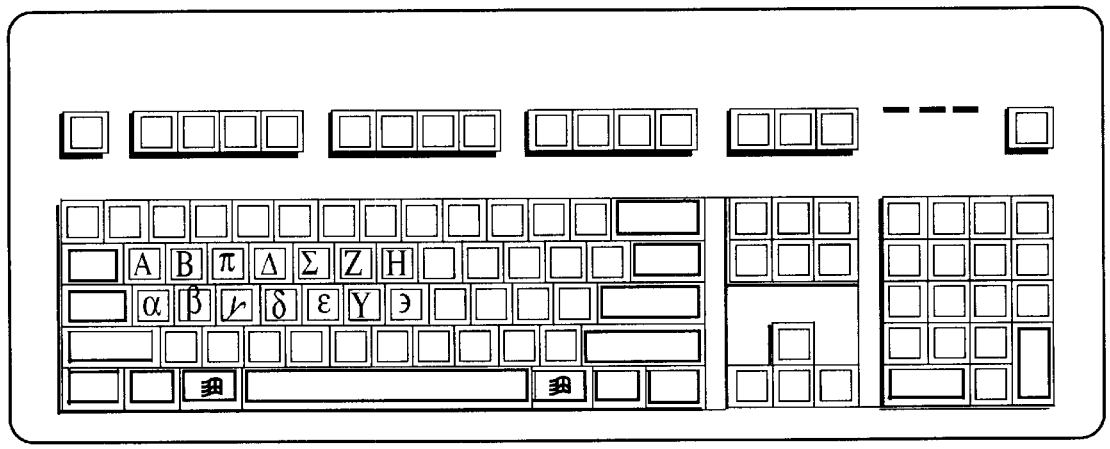
FIG. 12 illustrates a VR keyboard for the Greek alphabet.
Figure 13:
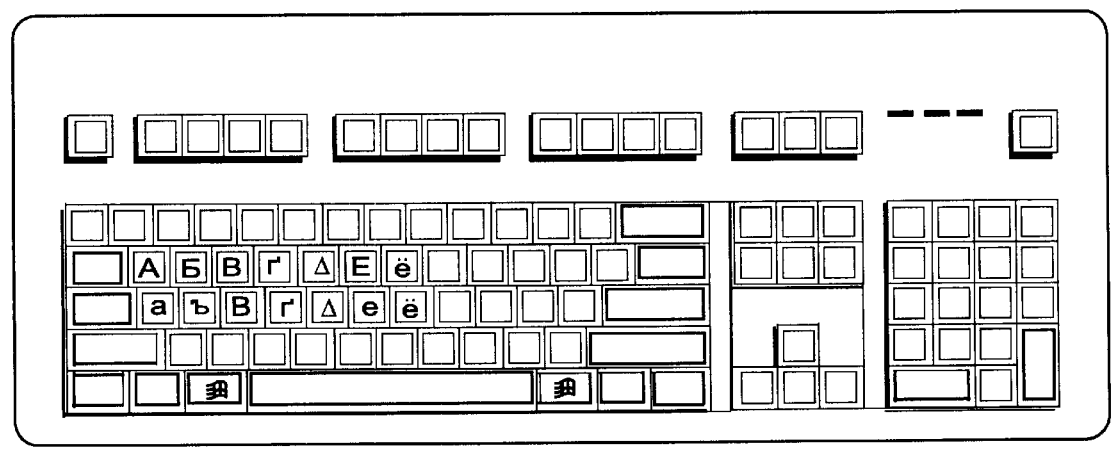
FIG. 13 illustrates a VR keyboard for the Cyrillic alphabet.
Figure 14:
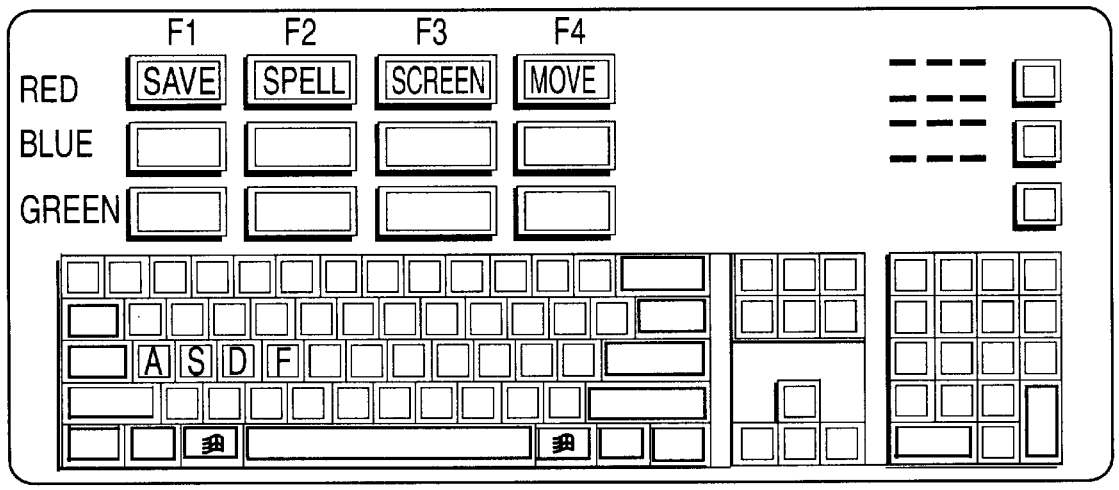
FIG. 14 illustrates a VR keyboard with word processing command keys.
Figure 15:
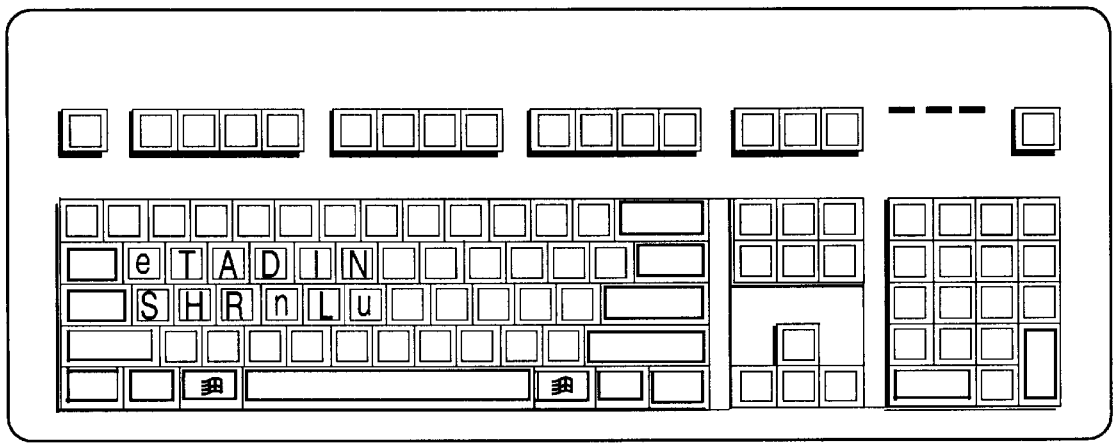
FIG. 15 illustrates a VR keyboard for a typesetting application.

FIG. 12 illustrates a VR keyboard for the Greek alphabet. FIG. 13 illustrates a VR keyboard for the Cyrillic alphabet. FIG. 14 illustrates a VR keyboard with word processing command keys, such as SPELL, SCREEN, SEARCH, etc. used in "WORDPERFECT" available from "COREL". FIG. 15 illustrates a VR keyboard for a typesetting application, with an ETAOIN SHRDLU key arrangement.

Other formats may also be included such as the Dvorak keyboard. Since some consider the QWERTY keyboard to be an accident of history which has caused technological lock-in to an allegedly inefficient keyboard layout, the disclosed VR keyboard system and method may implement the Dvorak keyboard and any other formats which may be more efficient. Accordingly, the disclosed VR keyboard system and method frees typists of such alleged technological lock-in. In addition, the keyboard may be customized using a customize keyboard layout subroutine implemented by the first processor. For example, left-handed people may completely reverse the layout of the standard QWERTY keyboard to form a mirror image adapted for left-handed people; for example, to have the right hand positioned to control, for example, the keys for ASDF, and so may form what may be called a YTREWQ keyboard, or alternatively a POIUYT keyboard.

Figure 16:
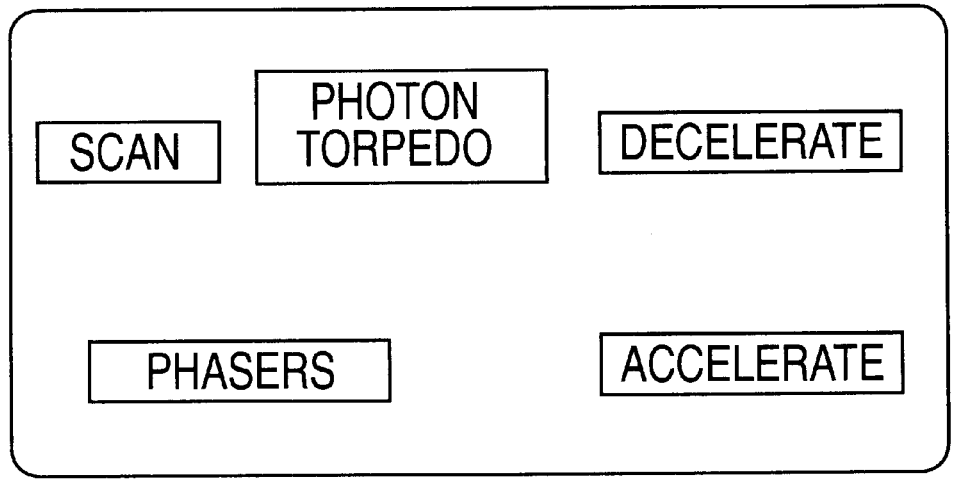
FIG. 16 illustrates a VR keyboard with specialized keys for a computer game.

FIG. 16 illustrates a VR keyboard with specialized keys for a computer game, such as a "STAR TREK" game available through "PARAMOUNT" for providing commands to activate phasers, photo torpedoes, scanning functions, starship acceleration and deceleration, etc. corresponding to actuatable commands in the game. Other computer games such as "DOOM", "HERETIC", and "ULTIMA III" use the keyboard to implement game commands. The disclosed VR keyboard system and method may be used to implement such layouts. In addition, such game command layouts may be loaded into the VR program as configuration files during or after installation of the computer game.

Figure 17:
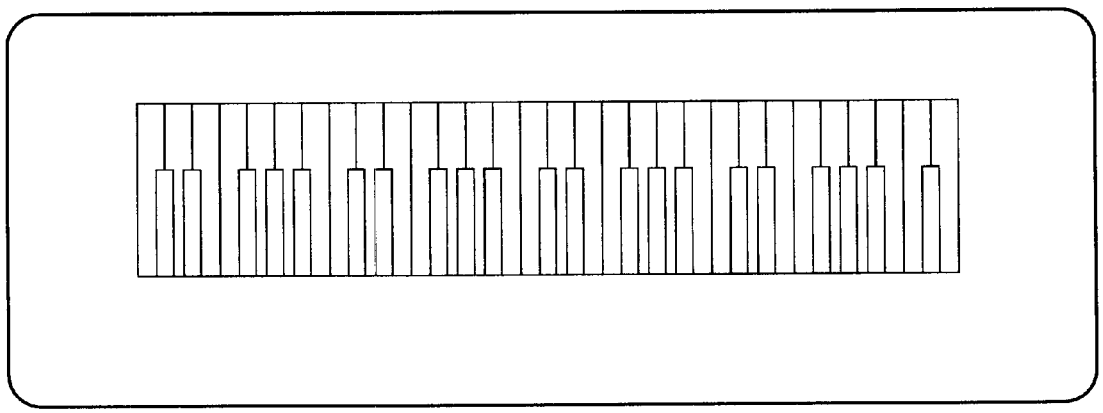
FIG. 17 illustrates a VR keyboard for providing a piano-like keyboard.

FIG. 17 illustrates a VR keyboard for providing a piano-like keyboard, which allows the user to actuate the VR keys to perform actual music through the second processor and multimedia application programs.

Figure 18:
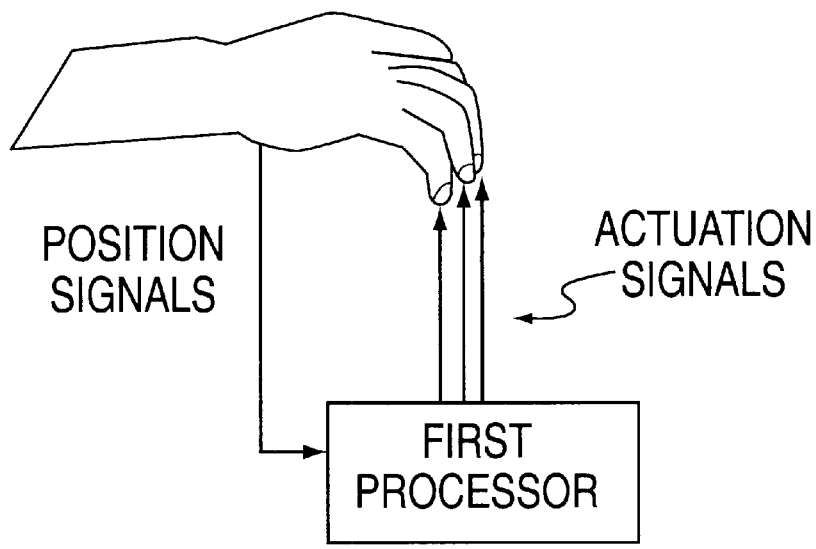
FIG. 18 illustrates a third embodiment of the VR keyboard system and method using a force feedback VR glove.
Figure 19:
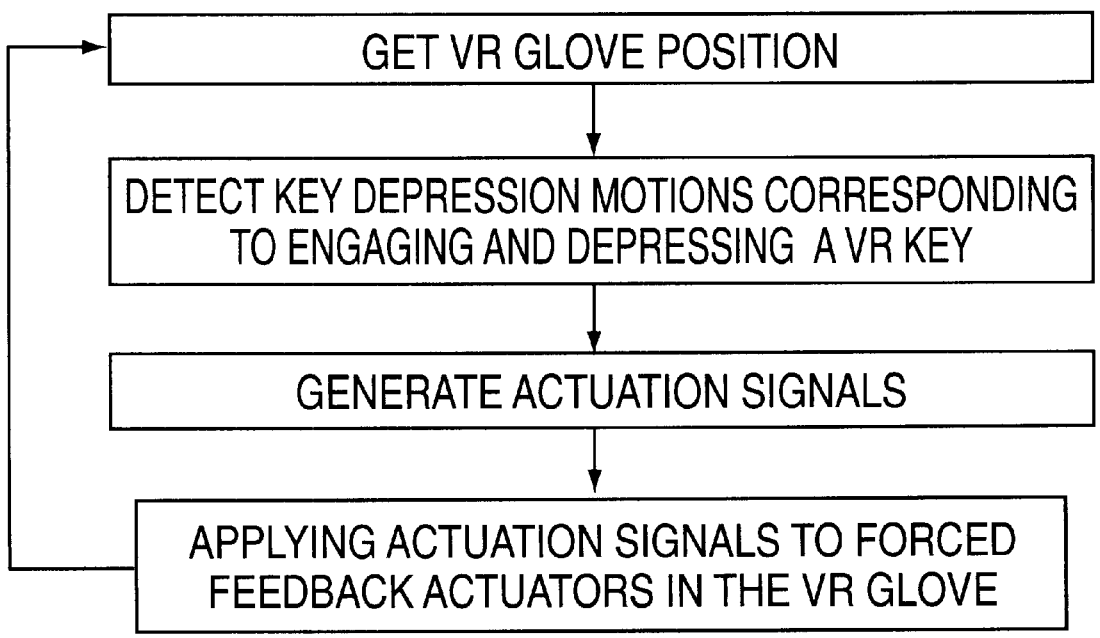
FIG. 19 illustrates a flowchart of a method implementing the third embodiment of FIG. 18.

FIG. 18 illustrates a third embodiment of the VR keyboard system and method using a force feedback VR glove, in which the position signals from the VR glove are provided to the first processor, which in turn generates and sends actuation signals to a plurality of actuators, for example, in the tips of the fingers of the VR glove. FIG. 19 illustrates a flowchart of a method implementing the third embodiment of FIG. 18, in which the VR keyboard system gets the VR glove position, and detects for motions of the fingers corresponding to the engaging and depressing of the VR keys. Subsequent to or concurrent with the generation of key codes and the other steps of FIG. 4 to perform the VR keyboard method, the disclosed VR keyboard system and method generates actuation signals corresponding to the keys depression motions, and applies the actuation signals to the actuators in the VR glove to provide force feedback to the user. Accordingly, the user is provided with the physical sensation of depressing an actual keyboard key, when instead the user has depressed in VR a VR key of the VR keyboard.

Figure 20:
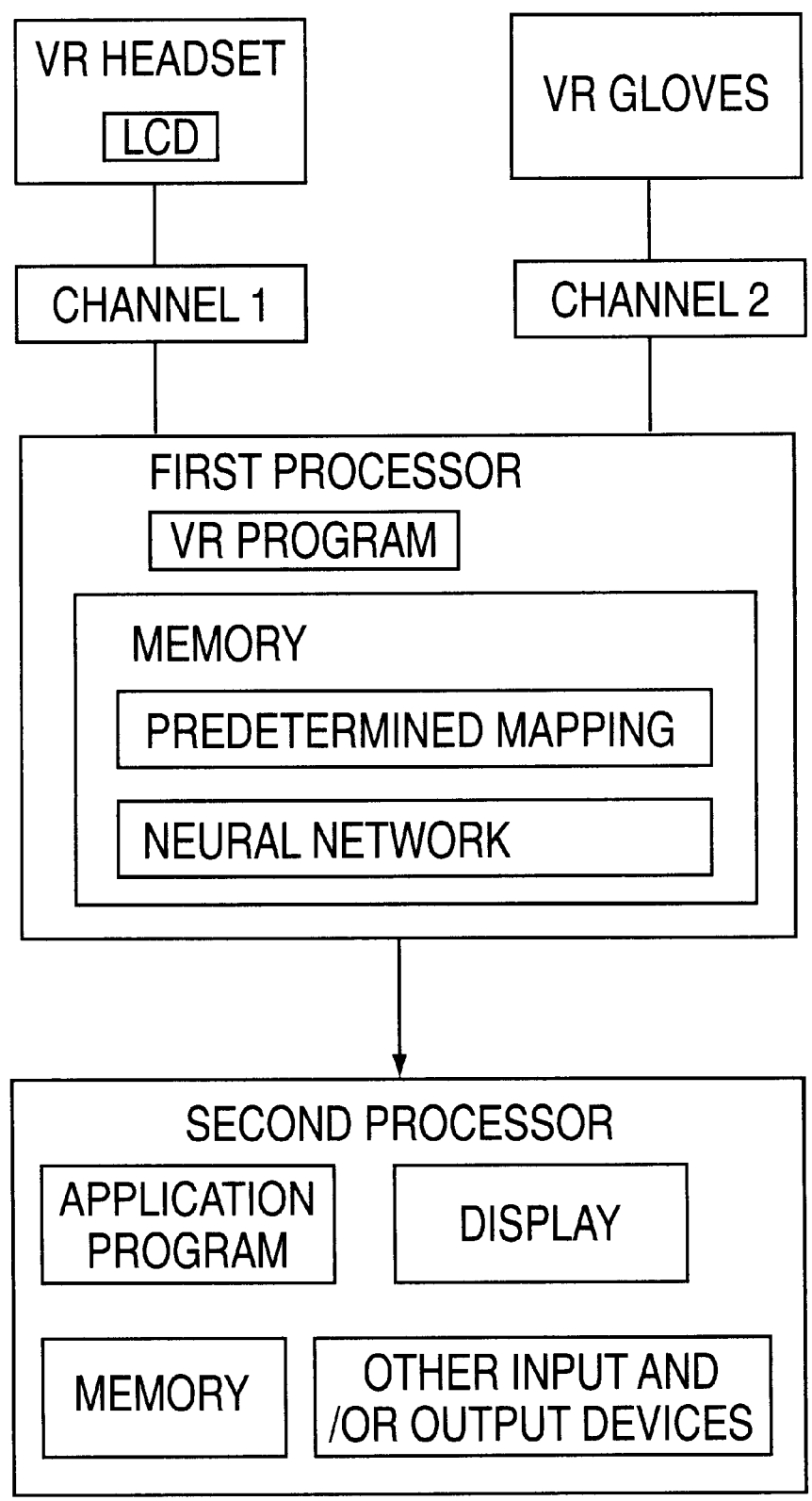
FIG. 20 illustrates a schematic of a fourth embodiment of the VR keyboard system and method using a neural network.

FIG. 20 illustrates a schematic of a fourth embodiment of the VR keyboard system and method using a neural network, which is implemented, for example, in the first processor. In particular, the neural network may be characterized as parameters of a plurality of nodes stored in conjunction with the predetermined keyboard mapping in the memory of the first processor. In addition or alternatively, the neural network may be implemented in an integrated circuit.

Figure 21:
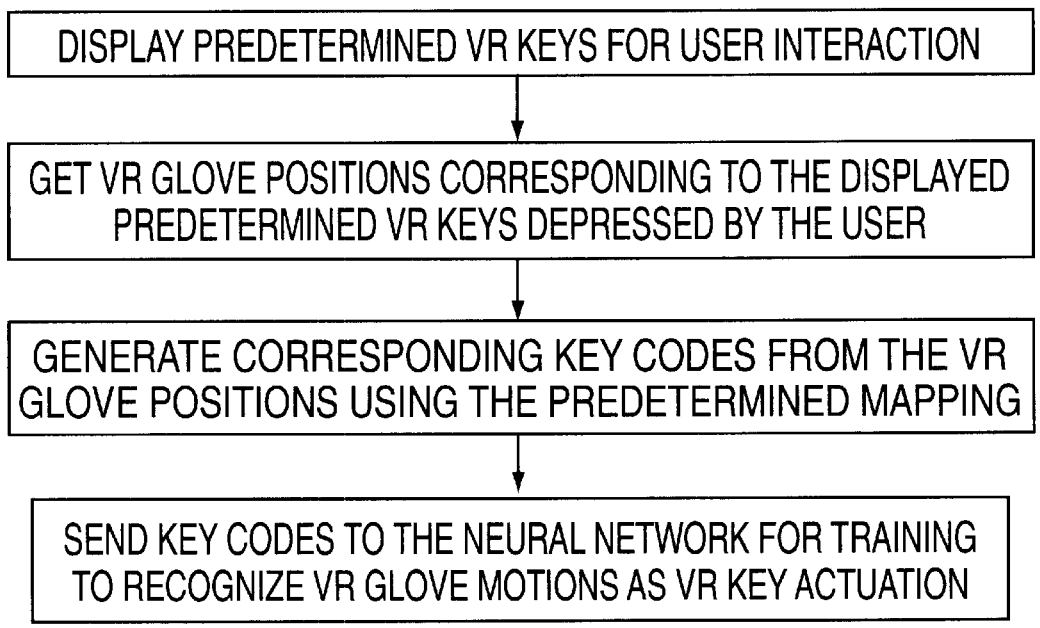
FIG. 21 illustrates a flowchart of a method for training the neural network in the fourth embodiment of FIG. 20.

FIG. 21 illustrates a flowchart of a method for training the neural network in the fourth embodiment of FIG. 20, in which the VR keyboard system and method displays a set of predetermined VR keys to the user through the LCD of the headset, or alternatively through the display associated with the second processor. The display of keys is provided for user interaction to prompt the user to activate the VR keys as specified VR keys are displayed. The set of predetermined keys may include at least one pass through every available VR key on the VR keyboard.

The disclosed VR keyboard system and method then get VR glove positions corresponding to the displayed predetermined VR keys depressed in VR by the user, and generate corresponding key codes from the VR glove positions using the predetermined mapping. The key codes and the VR glove positions are sent as inputs to the neural network for training, such that the trained neural network recognizes the VR glove motions as corresponding to VR key actuations. The trained neural network may be stored as a predetermined neural network mapping in the memory of the first processor.

The trained neural network may thus be used to allow the user to perform touch typing without viewing the VR keyboard. Accordingly, the VR keyboard may be displayed during the training period, and, optionally, to not be displayed during use by the user to input data and commands. The user may then touch type using an "invisible" keyboard; that is, the keyboard is not physical, yet not displayed to the user. Such VR touch typing using an invisible VR keyboard may be used to reduce the computational power required to operate the VR program, since the step of updating the VR keyboard to reflect VR actuation of the VR keys is eliminated.

Figure 22:
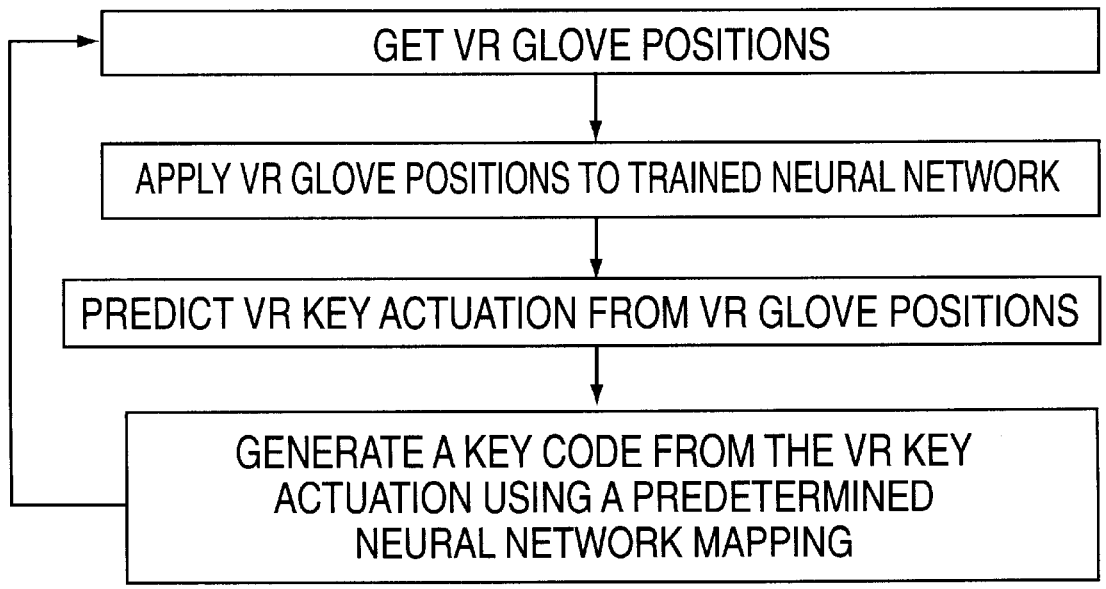
FIG. 22 illustrates a flowchart of a method using the VR keyboard system of FIG. 20 having a trained neural network.

FIG. 22 illustrates a flowchart of a method using the VR keyboard system of FIG. 20 using a trained neural network, which gets the VR glove positions and then applies the VR glove positions to the trained neural network. The neural network then generates a prediction of the VR key actuated or intended to be actuated by the user from the VR glove positions, and in turn generates the key code from the VR key actuation prediction using the predetermined neural network mapping.

Figure 23:
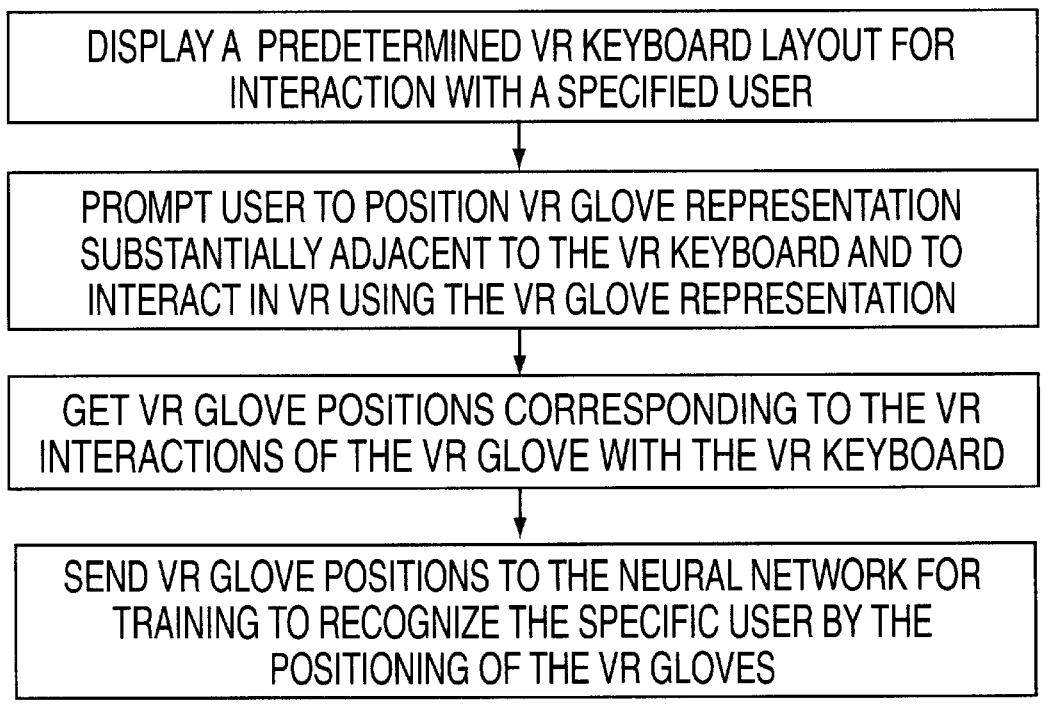
FIG. 23 illustrates a flowchart of an alternative method for training the neural network in the fourth embodiment of FIG. 20 to provide user authentication.

FIG. 23 illustrates a flowchart of an alternative method for training the neural network in the fourth embodiment of FIG. 20 to provide user authentication. The disclosed VR keyboard system and method displays a predetermined set of VR keys and/or a predetermined VR keyboard layout for interaction with a specified user. The user may be specified by a name, an identification number, a password, a biometric characteristic, etc.

The user is prompted to position the VR glove such that the user sees a VR glove representation, generated by the disclosed VR keyboard system and method, to be substantially adjacent to the VR keyboard displayed in the LCD of the headset. The user is prompted to interact in VR using the VR glove representation to depresses VR keys by, for example, typing in VR a predetermined sequence of VR keys, or a randomly generated sequence of VR keys. Alternatively, the user may be prompted to position the VR glove on an active or inactive physical keyboard to provide cues to the user to guide the positioning of the VR glove and fingers.

The disclosed VR keyboard system and method then get the VR glove positions corresponding to the VR interactions of the VR glove with the VR keyboard or the actual keyboard, and send the VR glove positions to the neural network for training to recognized the specific user by the positioning and use of the VR gloves on the VR keyboard or on the actual keyboard.

Such positioning and use of the VR gloves corresponds to how the specific user interacts with a keyboard, whether an actual keyboard or a VR keyboard, and such positioning and use may be sufficiently unique to the specific user in the positioning, orientation, and aspects of the hands, in the mannerisms of the user during typing, in the speed and reaction response times, etc. Accordingly, hand positioning during typing may function as a biometric uniquely associated with the user.

Figure 24:
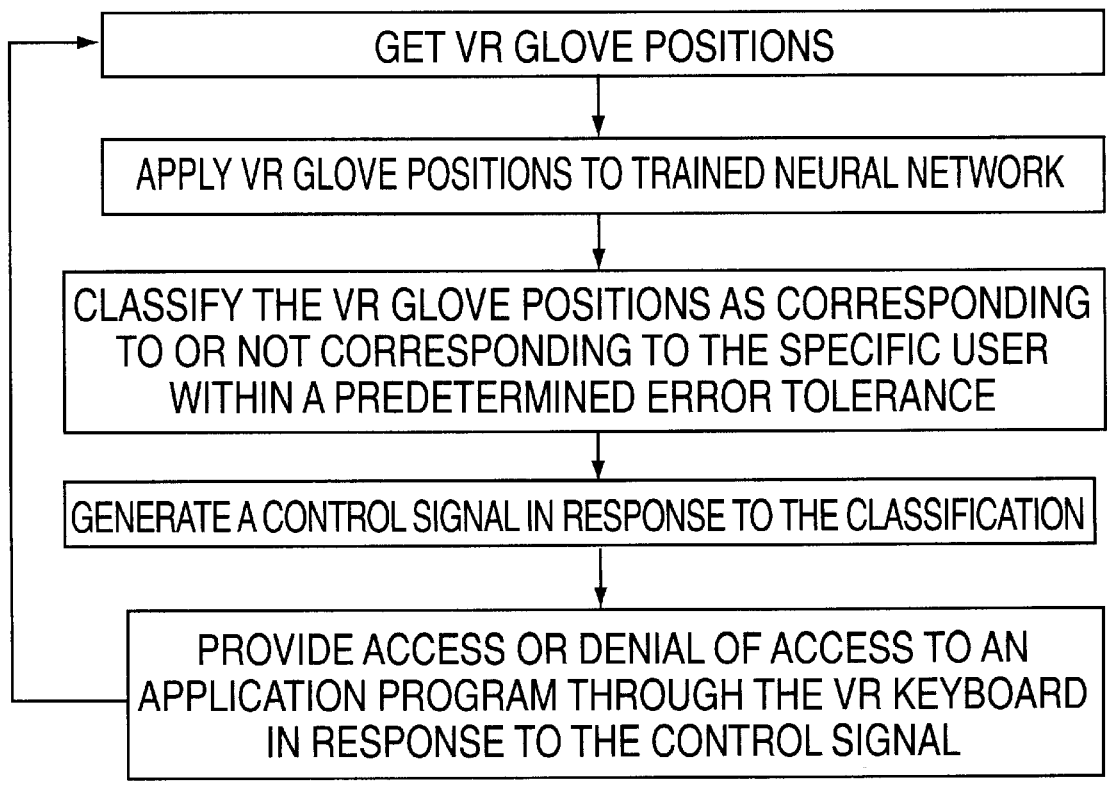
FIG. 24 illustrates a flowchart of a method for authenticating a user to use the VR keyboard system of FIG. 20.

FIG. 24 illustrates a flowchart of a method for authenticating a user under test to use the VR keyboard system and method of FIG. 20. Once the neural network is trained, the disclosed VR keyboard system and method displays the same predetermined sequence of letters, the same randomly generated sequence of keys, or even a new random set of keys for the user under test to actuate in VR. When the user under test is interacting to enter the displayed keys, the VR keyboard system and method get the VR glove positions, and apply the VR glove positions and the key codes of the displayed keys to the neural network. The neural network then classifies the VR glove positions as corresponding to or not corresponding to the specific user within a predetermined error tolerance; for example, 95% accuracy.

The VR keyboard system and method then generate a control signal in response to the classification, and provides access or denial of access of the user under test to an application program through the VR keyboard in response to the control signal.

Figure 25:
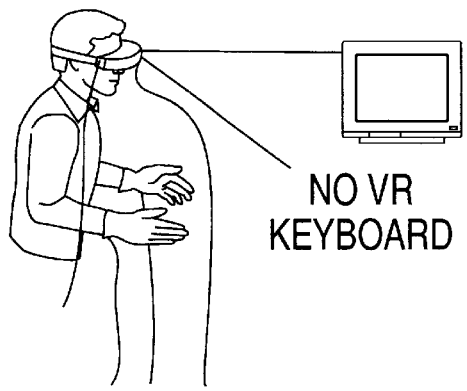
FIG. 25 illustrates a fifth embodiment of the VR keyboard system and method using an auto-hide feature to hide the VR keyboard.
Figure 26:
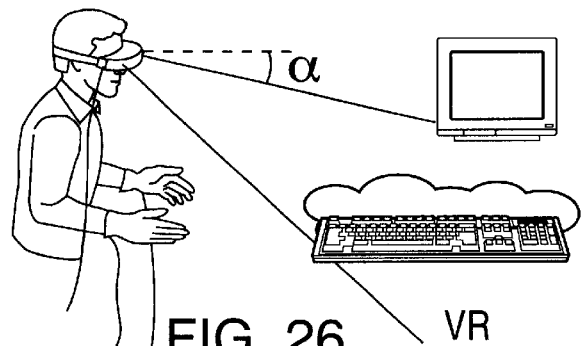
FIG. 26 illustrates the fifth embodiment of FIG. 25 displaying the VR keyboard when a user has the headset oriented in a predetermined orientation.

FIG. 25 illustrates a fifth embodiment of the VR keyboard system and method using an auto-hide feature to hide the VR keyboard, in which the user, with the headset tilted in a first direction, does not see a VR keyboard. FIG. 26 illustrates the fifth embodiment of FIG. 25 displaying the VR keyboard when a user orients the headset in a predetermined orientation, for example, at an angle α below the horizontal. Since the VR keyboard system and method may be used in any orientation, a reference orientation may be, for example, a surface perpendicular to a flat portion of the LCD of the headset.

Figure 27:
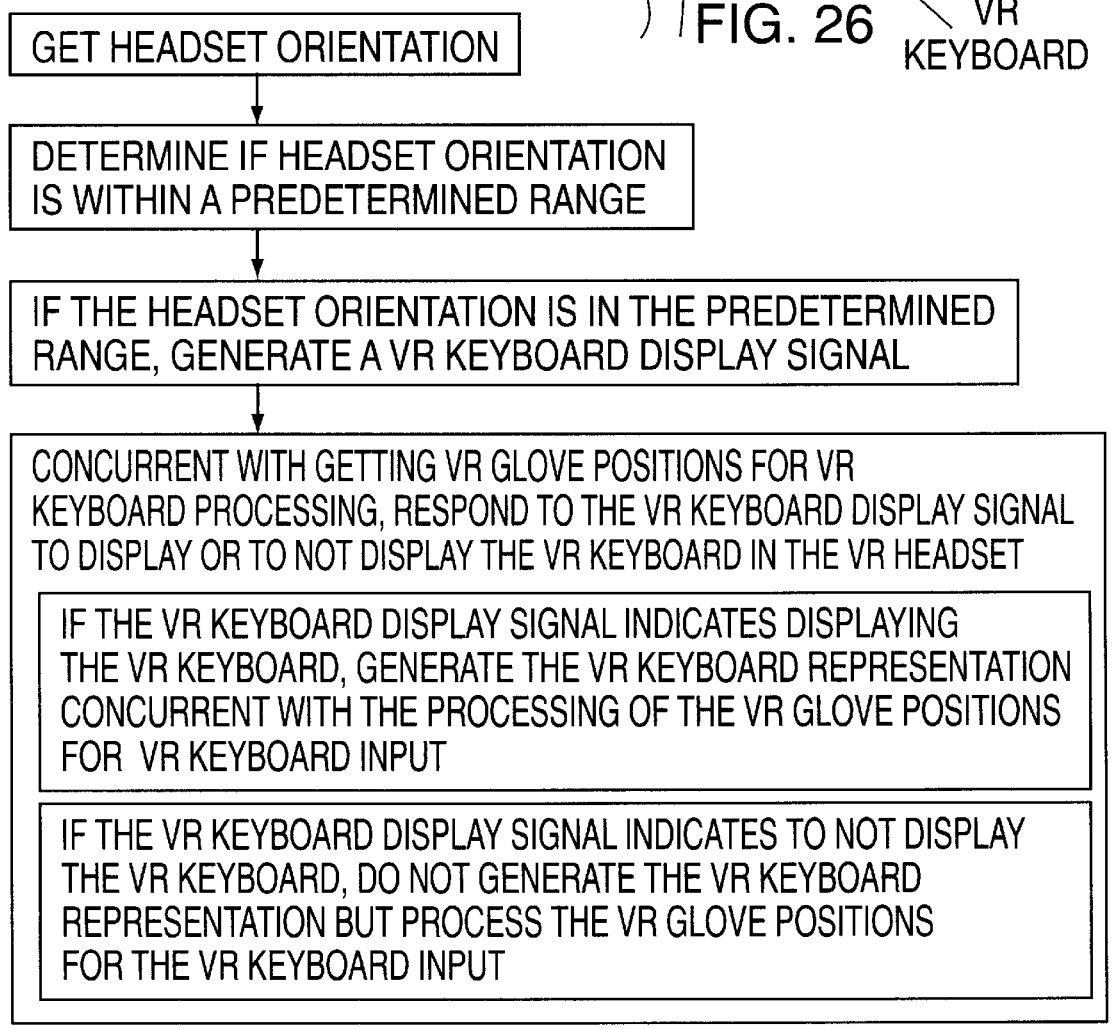
FIG. 27 illustrates a flowchart of a method of operation using the auto-hide feature in the fifth embodiment of the disclosed VR keyboard system and method.

FIG. 27 illustrates a flowchart of a method of operation using the auto-hide feature in the fifth embodiment of the disclosed VR keyboard system which gets the headset orientation from orientation sensors on the headset. The disclosed VR keyboard system and method then determine if the headset orientation is within a predetermined range; for example, greater than 30° below the horizontal. If so, a VR keyboard display signal is generated.

Concurrent with getting VR glove positions for VR keyboard processing, the method responds to the VR keyboard display signal to display or not to display the VR keyboard in the LCD of the VR headset. If the VR keyboard display signal indicates displaying the VR keyboard, the method generates the VR keyboard representation concurrent with the processing of the VR glove positions for receiving, processing, and indicating in VR the VR keyboard input. If the VR keyboard display signal indicates to not display the VR keyboard, the method does not generate the VR keyboard representation but continues processing of the VR glove positions for receiving and processing the VR keyboard input.

The method thus provides an auto-hide feature, in which the VR keyboard is hidden when the user is focusing on the actual display, or alternatively is focusing on the LCD display with the head tilting in a certain range of orientations. In this manner, user may be intent on viewing a portion of the display; for example, the application program such as a spreadsheet, and does not require looking at a keyboard, whether an actual keyboard or a VR keyboard. Alternatively, the user may be touch typing in VR, and so may be distracted by the view of the VR keyboard.

If the user chooses to focus on the keyboard; for example, if the user makes a typing mistake and/or cannot touch type, the user looks downward as though an actual keyboard is in front of the user. Accordingly, the disclosed VR keyboard system and method provide the user with the traditional environment of typing with a physical keyboard, including looking down and focusing on a keyboard, without the use of an actual keyboard. In addition, since the VR keyboard is not always displayed, the use of the auto-hide feature may reduce the computational power required to display and update the VR keyboard.

Figure 28:
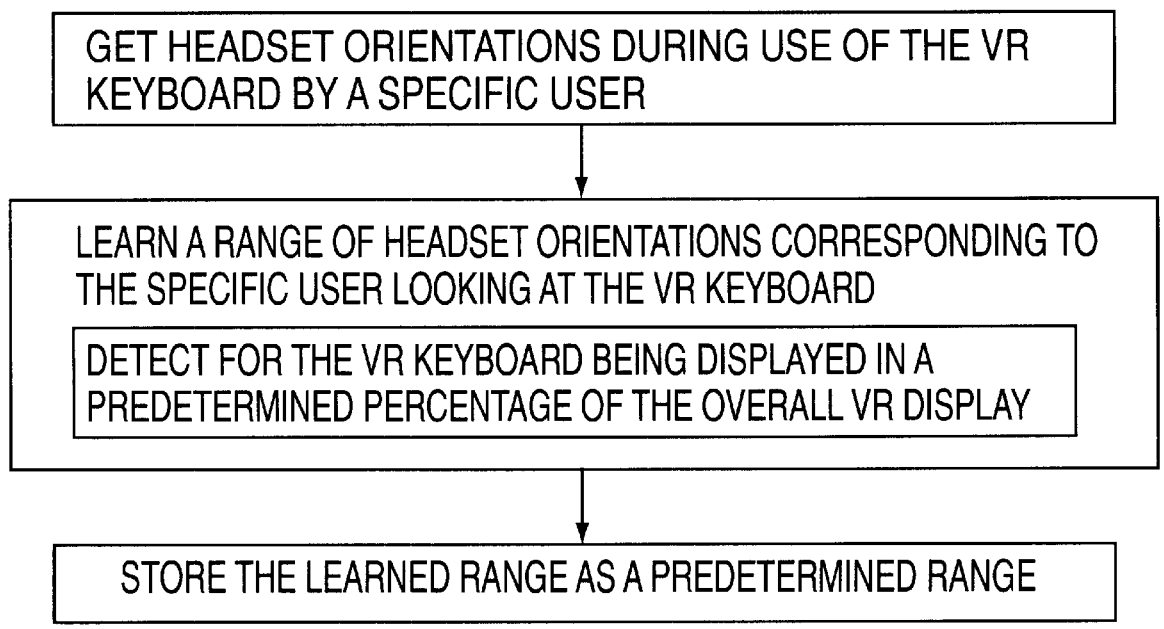
FIG. 28 illustrates a flowchart of a method for determining a range of orientations for use in the fifth embodiment.

The range of orientations of the auto-hide feature may be predetermined, for example, head tilts of greater than 30° may be used as default values, or the user may specify a different value. Alternatively, FIG. 28 illustrates a flowchart of a method for determining a range of orientations for use in the fifth embodiment. The VR keyboard may be set to be viewed at a predetermined angle below a horizontal line or surface, or the angle may be set randomly. As a specific user uses the VR keyboard, the method gets the headset orientations during use, and learns the range of headset orientation corresponding to the specific user looking at the VR keyboard, for example, to determine a relative comfort level for the specific user.

The learning step may be performed by a neural network, by a processor determined an average value of the angular tilting by the user over a duration of use, or by other techniques for optimizing a range of angles associated with the specific user. For example, the learning step may include detecting for the VR keyboard being displayed in a predetermined percentage of the overall VR display; that is, the user may require viewing over 80% of the VR keyboard to effectively operate the VR keyboard. The learning step may then average the percentages over a duration of use, and determine an optimum range of angles for providing such an average percentage. The learned range is then stored in memory as the predetermined range.

Figure 29:
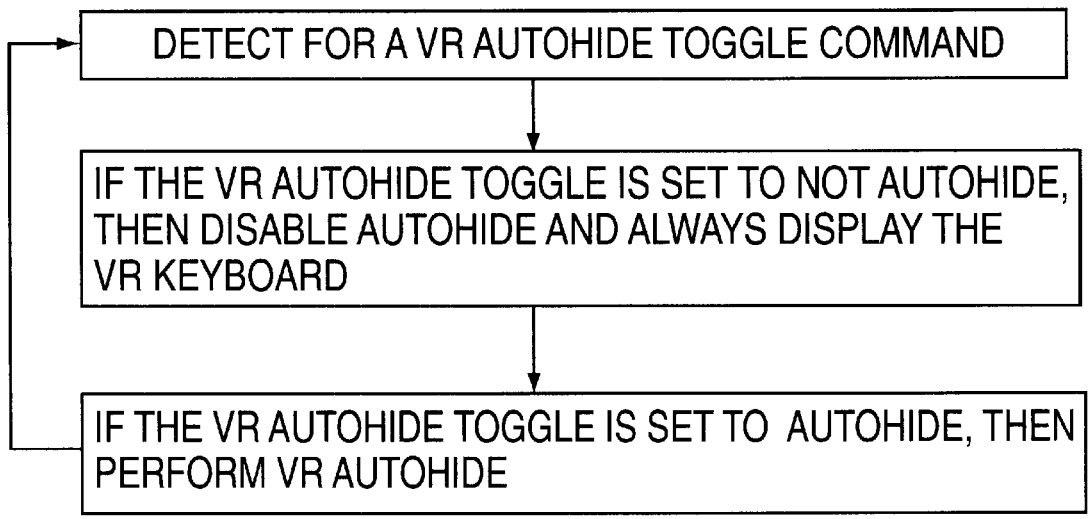
FIG. 29 illustrates a flowchart of a method for toggling the auto-hide feature of the fifth embodiment.

FIG. 29 illustrates a flowchart of a method for toggling the auto-hide feature of the fifth embodiment. The auto-hide feature may be an optional feature which may be toggled by a predetermined VR auto-hide toggle command. Upon detecting such a command, if auto-hide is set to be disabled, the method disables the auto-hide feature and always displays the VR keyboard. Otherwise, if the auto-hide feature is set to be active; that is, to auto-hide the VR keyboard, then auto-hide is performed such that the VR keyboard is generated and displayed only if the user is looking down within a predetermined range. The method may then loop back and continually check for the toggle command, using, for example, an event-driven object of object oriented programming responding to the toggling of the auto-hide feature.

Figure 30:
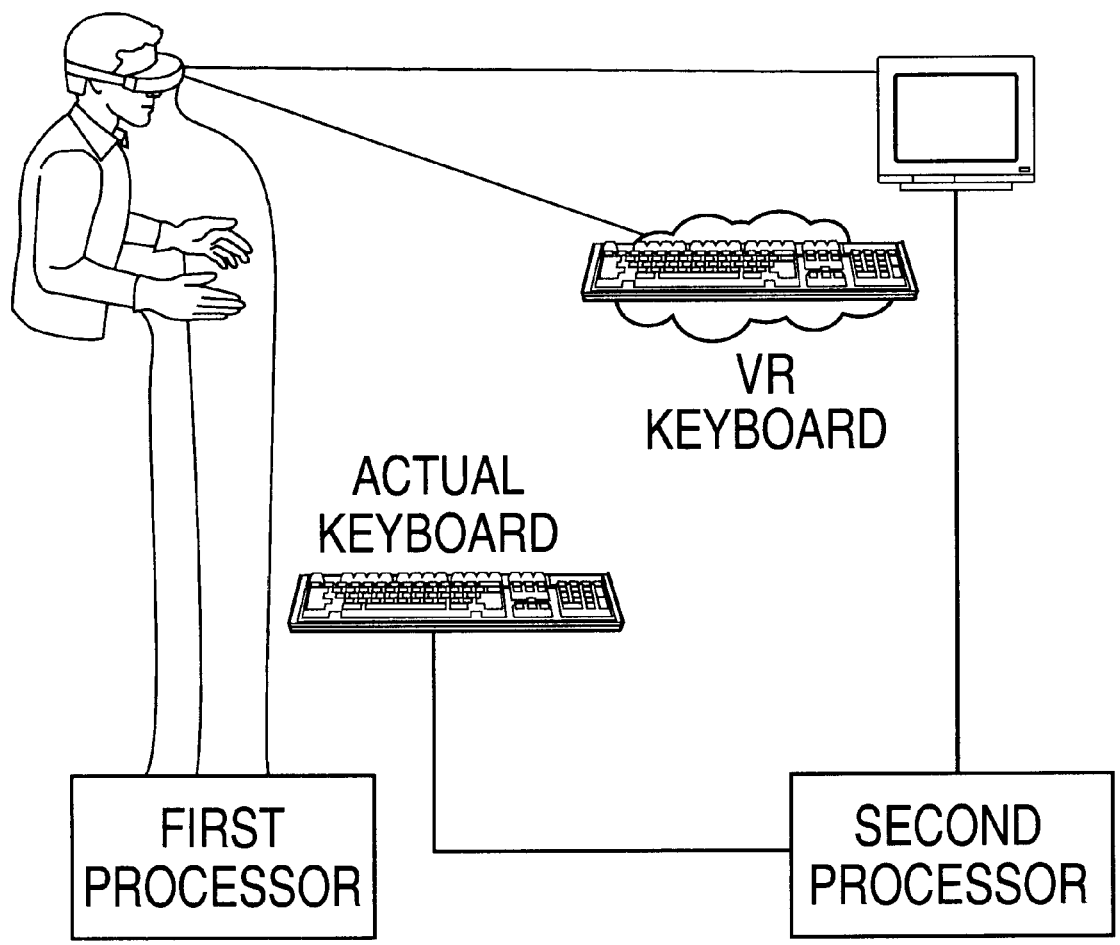
FIG. 30 illustrates a sixth embodiment of the disclosed VR keyboard system and method using both a VR keyboard and an actual physical keyboard.
Figure 31:
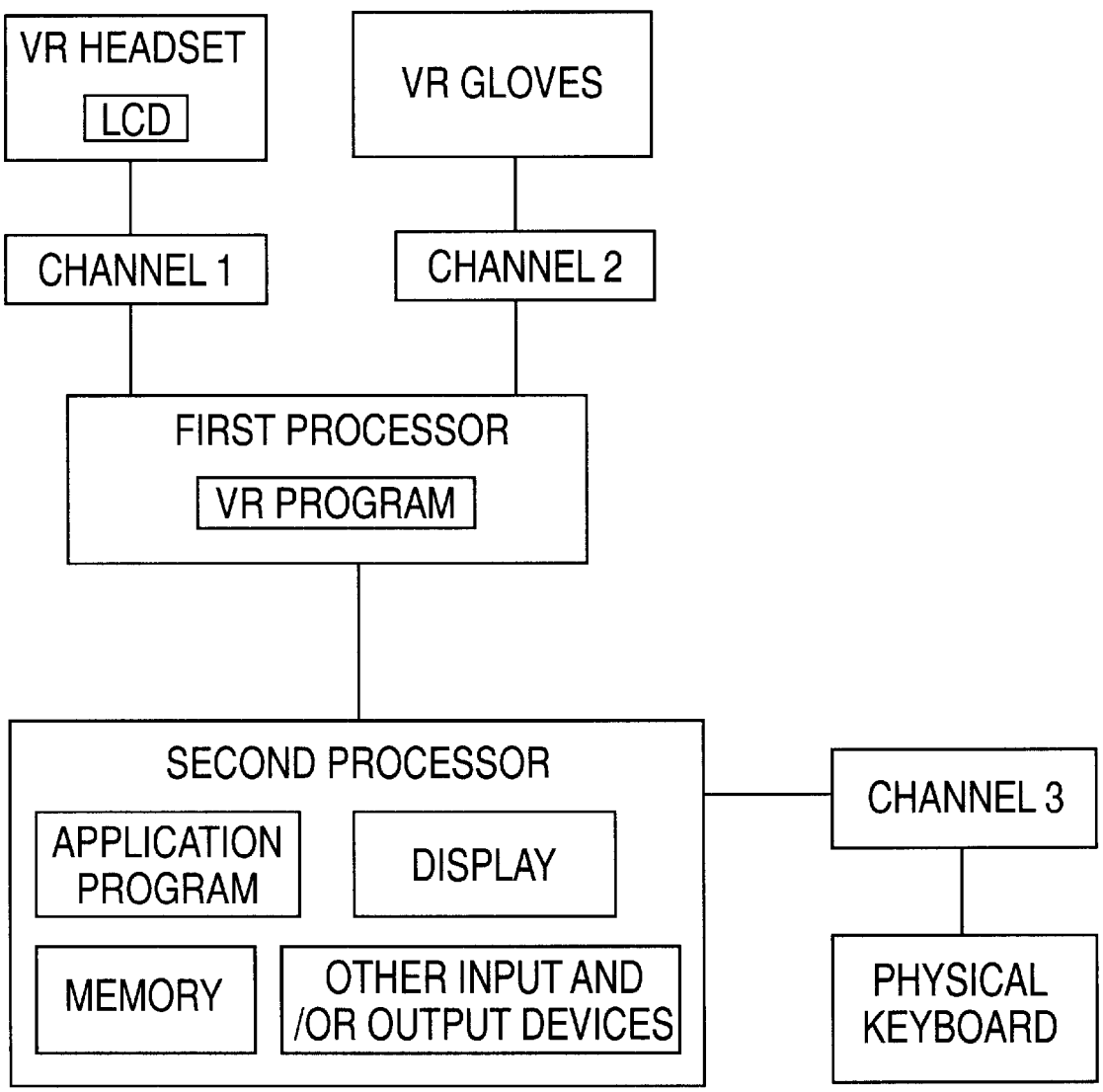
FIG. 31 illustrates a schematic of the sixth embodiment of FIG. 30.

FIG. 30 illustrates a sixth embodiment of the disclosed VR keyboard system and method using both a VR keyboard and an actual physical keyboard, in which the actual keyboard may be used to generate the predetermined mapping to be used by the VR keyboard. FIG. 31 illustrates a schematic of the sixth embodiment of FIG. 30, in which the actual physical keyboard is connected to the second processor, or alternatively to the first processor, through a third channel, which may be a wire, a wireless connection, a fiber optic, etc.

Figure 32:
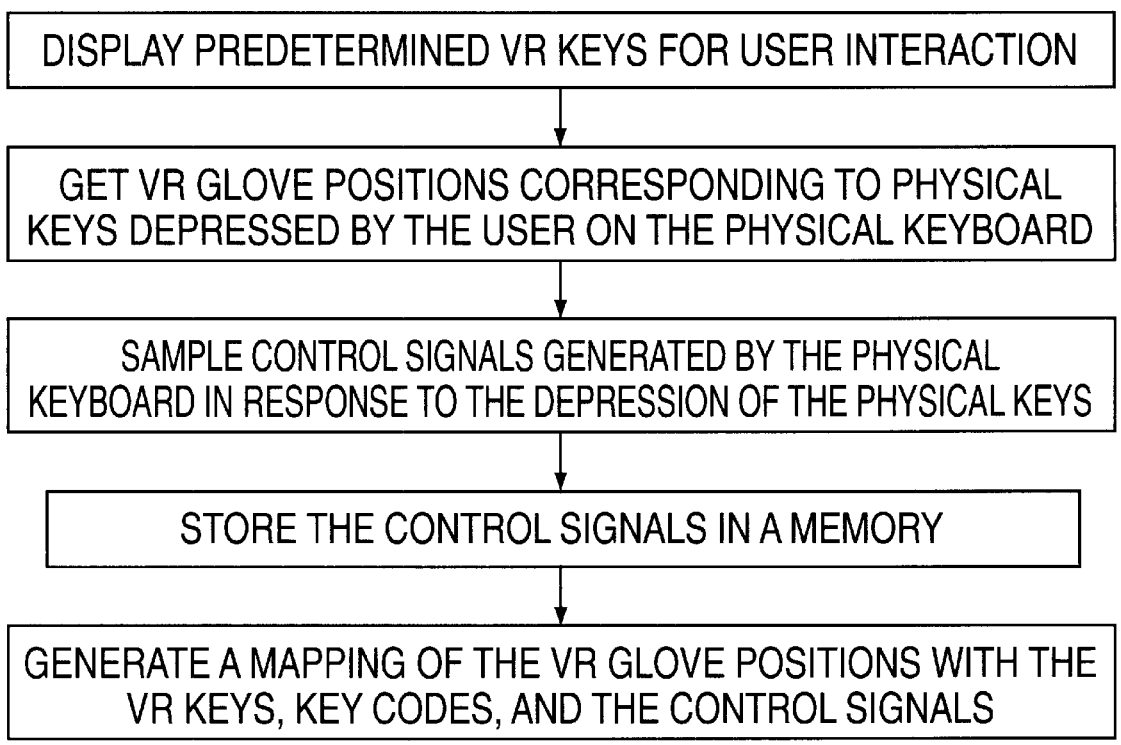
FIG. 32 illustrates a flowchart of a method for sampling control signals from an actual keyboard for use by the VR keyboard.

FIG. 32 illustrates a flowchart of a method for sampling control signals from an actual keyboard for use by the VR keyboard, in which the VR keyboard system and method displays through the VR headset a predetermined set of VR keys for user interaction. Alternatively, the user may be prompted by a display of keys and commands on the display associated with the second embodiment to type the corresponding keys on the physical keyboard. The predetermined set may include at least one pass through every available VR key and command, including key combinations such as CTRL-ALT-DEL on the VR keyboard. As the user enters every key combination on the physical keyboard while wearing the activated VR glove, the VR keyboard system and method get VR glove positions corresponding to the physical keys being depressed by the user.

The physical keyboard is provided with appropriate power connections such that, as the physical keys are being sequentially depressed, the physical keyboard generates corresponding control signals, which are sampled by the VR keyboard system and method in response to the depression of the keys prompted by the sequential display of VR keys to the user through the VR headset. Once the control signals are sampled, the VR keyboard system and method store the control signals in a memory, and generate a mapping of the VR glove positions with the VR keys, associated key codes, and the control signals.

Figure 33:
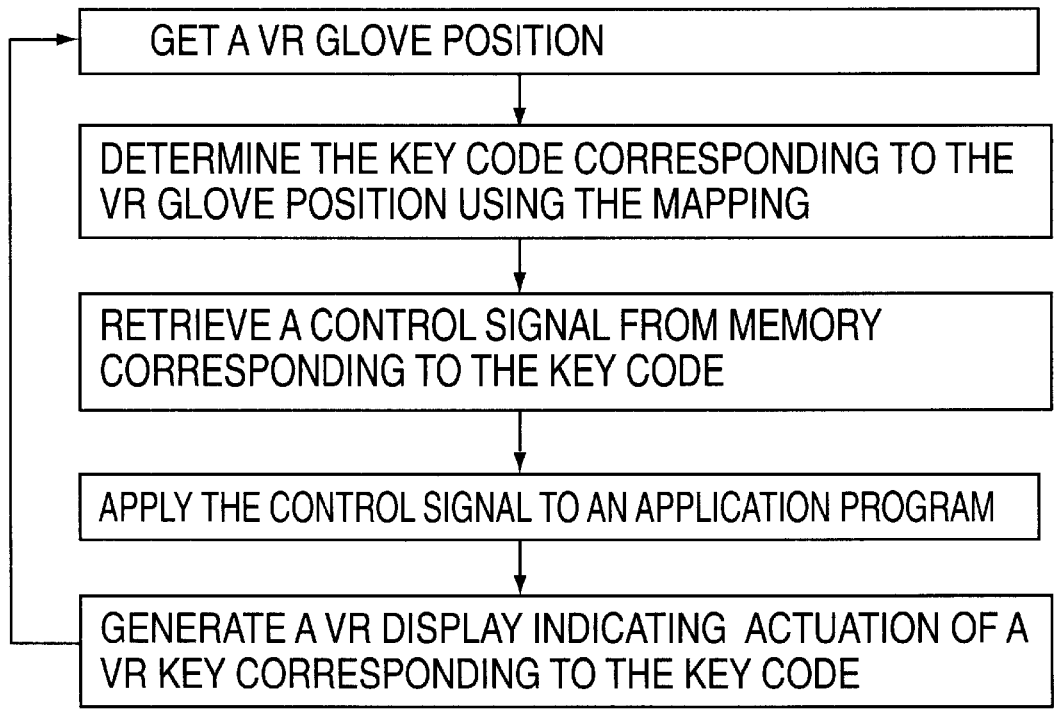
FIG. 33 illustrates a flowchart of a method using sampled control signals to operate the VR keyboard.

FIG. 33 illustrates a flowchart of a method using sampled control signals to operating the VR keyboard, in which a VR glove position is received, and a corresponding key code is determined therefrom using the mapping stored in the memory. The corresponding control signal is retrieved from the memory, and applied as a control signal or control code to the application program; that is, the control signal is sent to the application program and/or the second processor as though it is generated and transmitted by an actual keyboard, when in fact it is generated by the VR keyboard system and method. The VR keyboard system and method also generate a VR display indicating actuation of a VR key corresponding to the key code.

Figure 34:
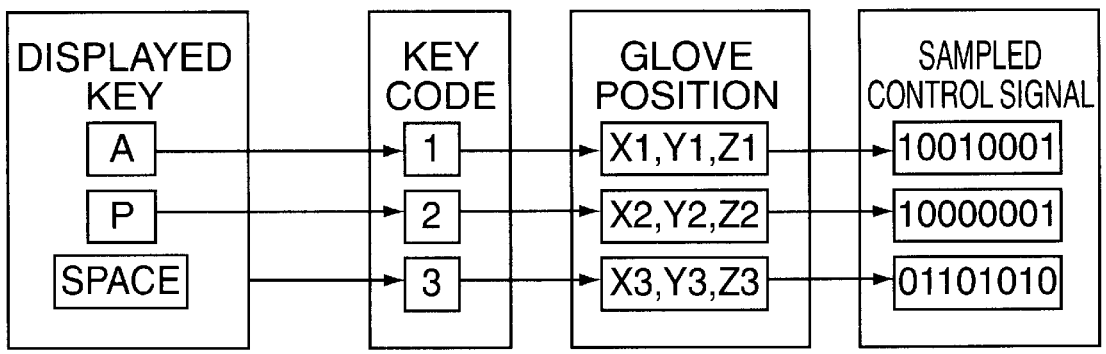
FIG. 34 illustrates a mapping of glove positions with displayed keys and sampled control signals.

FIG. 34 illustrates a mapping of glove positions with displayed keys and sampled control signals using the method of FIGS. 32–33, in which a displayed key provided to the user is associated with a key code generated by the VR keyboard system and method, and associated with the control signals sampled from the actual keyboard. The key codes may be arbitrary, or may be ASCII values, with the key codes serving as an index of the displayed key with the glove positions and sampled control signals. For example, a capital "A" may be assigned a key code "1", and, after detection of the corresponding VR glove positions, is associated with a glove position (X1, Y1, Z1) corresponding to the user moving the VR glove to such a position in space. Concurrently, the VR glove position, the key code, and the displayed key are associated in the mapping with a control signal sampled from the physical keyboard. The sampling may be performed by a digital sample-and-hold circuit. For example, the control signal associated with the capital "A" may be a digital bit sequence such as "10010001". Using such sampled controls signals, the disclosed VR keyboard system and method may be adapted for VR keyboard data and command input for any computing system which heretofore uses a physical keyboard, since the VR keyboard system and method generates substantially identical control signals for input to the computer system.

Figure 35:
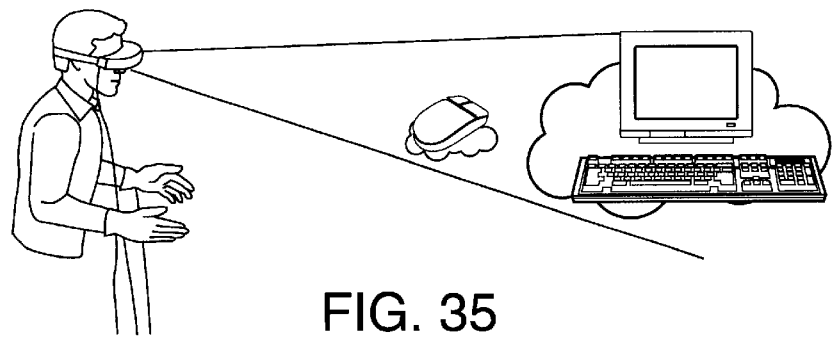
FIG. 35 illustrates a seventh embodiment of the VR keyboard system and method with a VR mouse.
Figure 36:
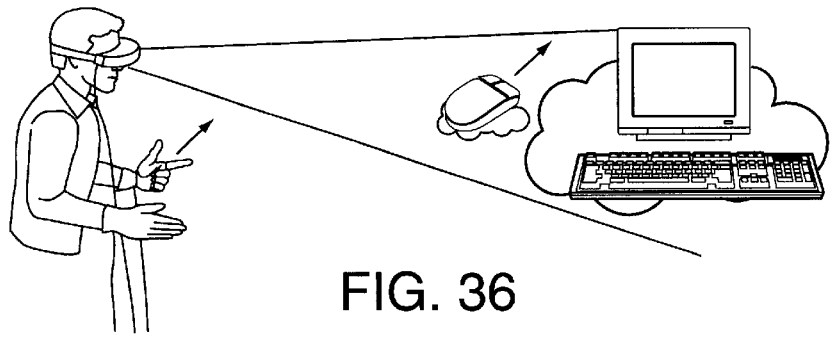
FIG. 36 illustrates the seventh embodiment using the VR glove to operate the VR mouse.
Figures 37, 38:
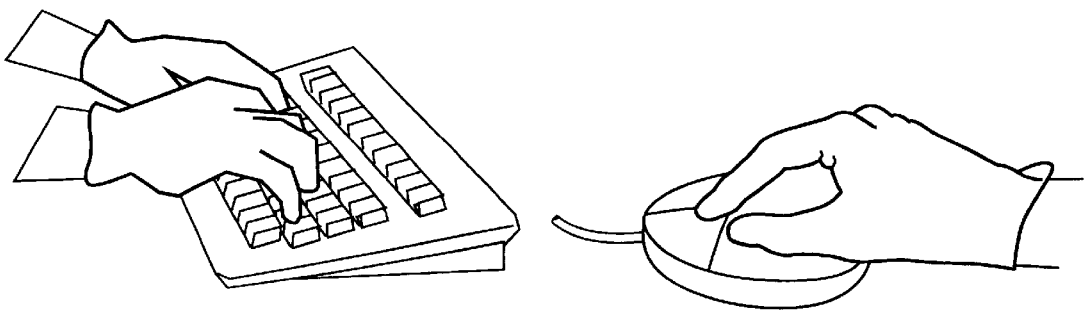
FIG. 37 illustrates VR glove positions for keyboard use.
FIG. 38 illustrates VR glove positions for mouse use.

FIG. 35 illustrates a seventh embodiment of the VR keyboard system and method with a VR mouse. FIG. 36 illustrates the seventh embodiment using the VR glove to operate the VR mouse, in which a predetermined glove configuration such as a clenched fist, upward thumb, and extended index finger in the VR glove corresponds to operation of the VR mouse. Otherwise, the VR glove positions correspond to VR keyboard inputs. Alternatively, the disclosed VR keyboard system and method may detect glove positions and distinguish hand and glove orientations for keyboard use from hand and glove orientations for mouse use. FIG. 37 illustrates VR glove positions for keyboard use, in which the palm of the VR glove is substantially planar, with the fingers extending downward, relative to the palm. FIG. 38 illustrates VR glove positions for mouse use, in which the pal of the VR glove is substantially curved with the fingers extending about and/or surrounding at least a portion of the mouse.

Figure 39:
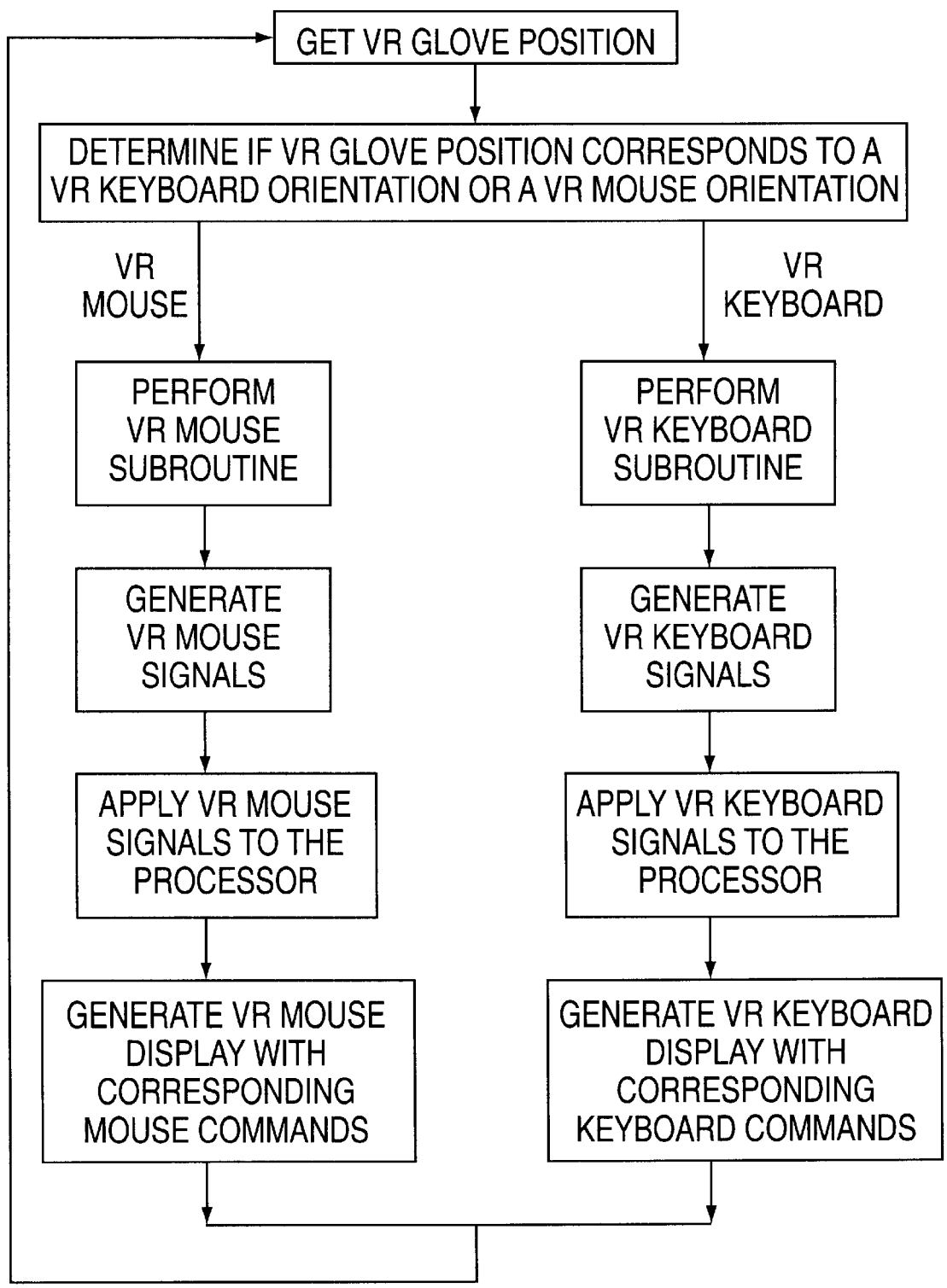
FIG. 39 illustrates a flowchart of a method for operating the seventh embodiment using either a VR keyboard or a VR mouse.

FIG. 39 illustrates a flowchart of a method for operating the seventh embodiment using either a VR keyboard or a VR mouse. The method gets the VR glove position, and determines if the VR glove position corresponds to a VR keyboard orientation or VR mouse orientation. If a VR mouse is to be used, then the method performs a VR mouse subroutine to receive VR glove positions as VR mouse movements and VR mouse button clicks and activations to generate corresponding mouse signals.

The VR mouse signals are applied to the second processor and/or the application program, for example, through mouse driver software, and the method then displays a VR mouse display which is changed and/or moved in the VR world by being displayed through the LCD of the VR headset to reflect the corresponding mouse commands, such as movement of a VR cursor or VR arrow on the LCD of the VR headset. The method may then loop back to process more VR glove positions.

However, if VR keyboard use is detected, the method performs the VR keyboard subroutines, described herein, to generate VR keyboard signals which are applied to the processor, with the VR keyboard being changed or updated to display the corresponding VR keyboard commands and VR key actuations.

Accordingly, since the VR keyboard and/or the VR mouse may generate keyboard and mouse signals, respectively, which may be input to keyboard driver software and mouse driver software, respectively, such keyboard and/or mouse signals may be input to the application program through any port with the respective software drivers configured to receive and process such keyboard and/or mouse signals therefrom, respectively. For example, the first processor may be connected to the second processor through a serial port, a COM port, a modem port or telephone jack, etc., and the appropriate driver software may be configured to receive data signals from such ports or jacks. Accordingly, a computer implementing the disclosed VR keyboard system and method may not require a keyboard port and/or a mouse port. Furthermore, such keyboard ports and mouse ports may be eliminated, thus saving on hardware implementations for such hardware-based actual keyboards and actual mouses/mice. In addition, the disclosed VR keyboard system and method may be implemented using "PLUG-AND-PLAY" technology, with the second processor capable of recognizing a connection to the disclosed VR keyboard system through any available port, and so the second processor may be automatically or manually reconfigurable to operate with the disclosed VR keyboard system in many diverse hardware configurations, include configurations without keyboard and/or mouse ports.

Figure 40:
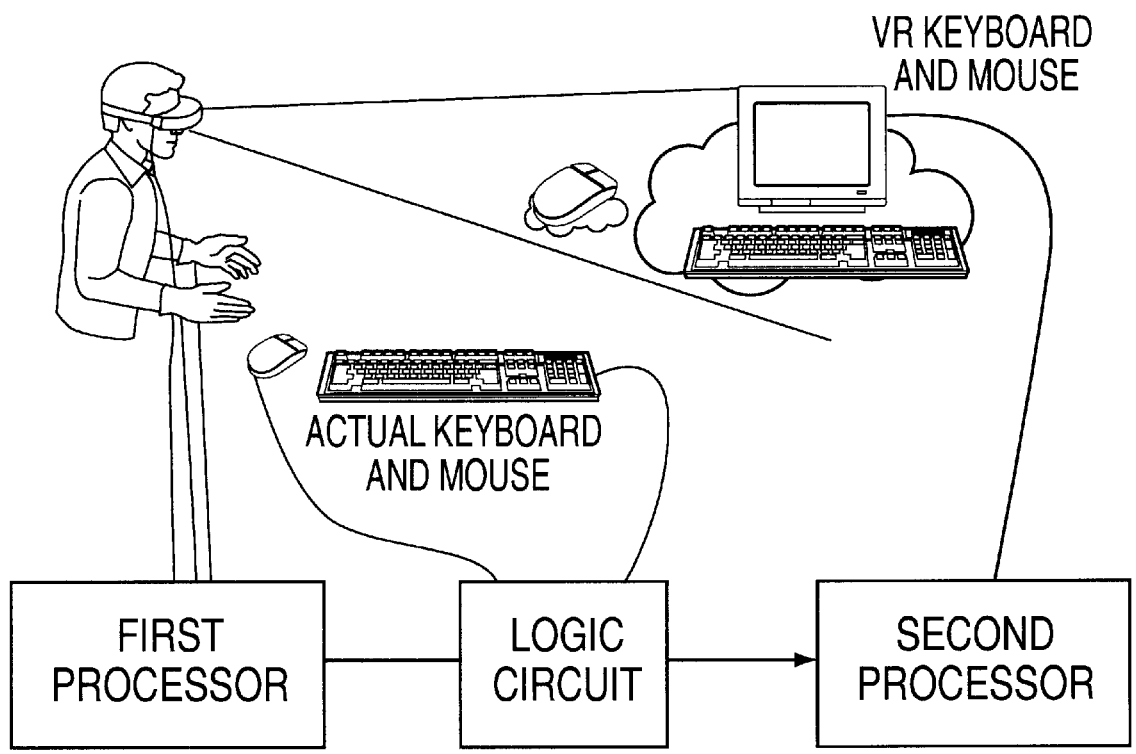
FIG. 40 illustrates an eighth embodiment of a VR keyboard and VR mouse for use with an actual keyboard and actual mouse.

FIG. 40 illustrates an eighth embodiment of a VR keyboard and VR mouse for use with an actual keyboard and actual mouse, in which an actual keyboard and/or mouse are connected to a logic circuit, which is also connected to the first processor. The logic circuit receives keyboard signals from the actual keyboard and, through the first processor, from the VR keyboard. The logic circuit receives mouse signals from the actual mouse and, through the first processor, from the VR mouse. The logic circuit may be an exclusive-OR (XOR) gate, or other logic gate circuits or switches, for switching or gating keyboard signals and/or mouse signals to the second processor.

Figure 41:
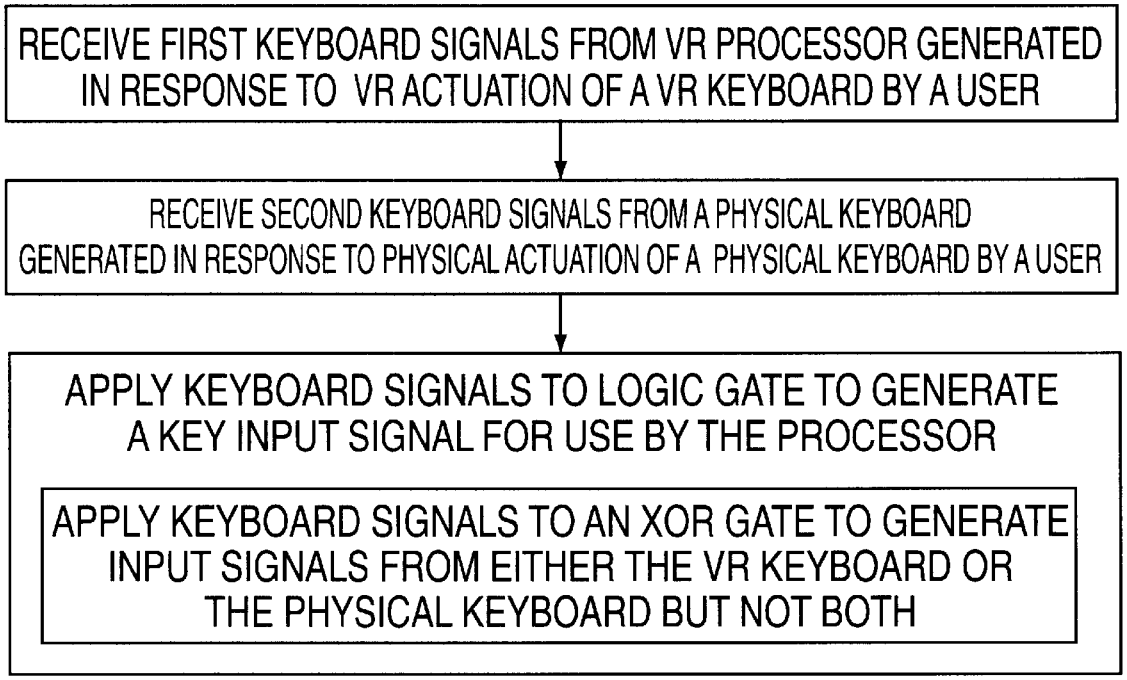
FIG. 41 illustrates a flowchart of operation of the eighth embodiment to respond to either the VR keyboard or the actual keyboard.
Figure 42:
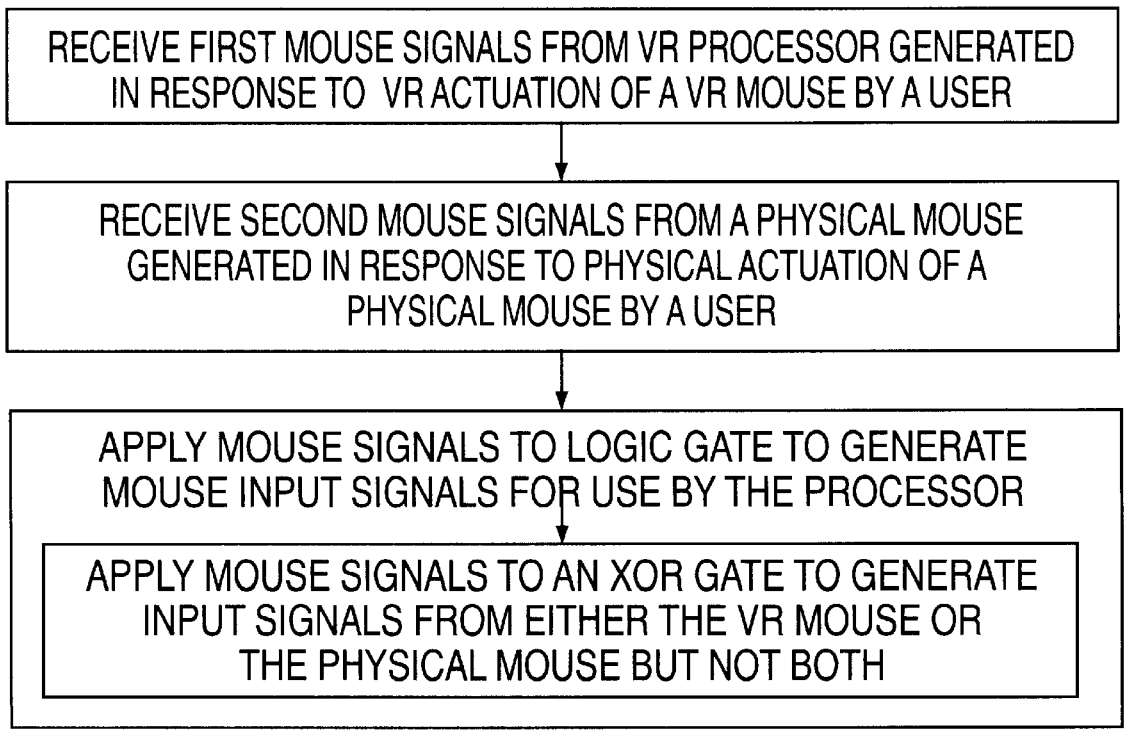
FIG. 42 illustrates a flowchart of operation of the eighth embodiment to respond to either the VR mouse or the actual mouse.

FIG. 41 illustrates a flowchart of operation of the eighth embodiment with a method to respond to either the VR keyboard or the actual keyboard, in which VR keyboard signals and actual keyboards signals are received, and then applied to the logic gate or circuit to generate a single key input signal to the second processor. Similarly, FIG. 42 illustrates a flowchart of a method to respond to either the VR mouse or the actual mouse, in which VR mouse signals and actual mouse signals are received, and then applied to the logic gate or circuit to generate a single mouse input signal to the second processor.

For example, using an XOR gate, signals from either the VR keyboard or the actual keyboard but not both are gated to the second processor. Similarly, using an XOR gate, signals from either the VR mouse or the actual mouse but not both are gated to the second processor. In this manner, if the user operates both VR devices and actual devices, the XOR gate of the logic circuit prevents conflicting signals from going to the second processor. If a conflict occurs, no signal is sent to the second processor.

Alternatively, the logic circuit may implement logic IF-THEN or logic IF-THEN-ELSE statements, such that if there is a VR keyboard signal being input to the second processor, then the actual keyboard signal is ignored, else the second processor receives and uses the actual keyboard signal. Accordingly, VR keyboard signals may be given precedence if present. Such logic IF-THEN or IF-THEN-ELSE statements may also be used conversely for ignoring the VR keyboard signals and giving keyboard signals from an actual keyboard presence if present. Such IF-THEN operations may also be used with signals from an actual mouse and a VR mouse, to give precedence or to resolve signal conflicts.

Figure 43:
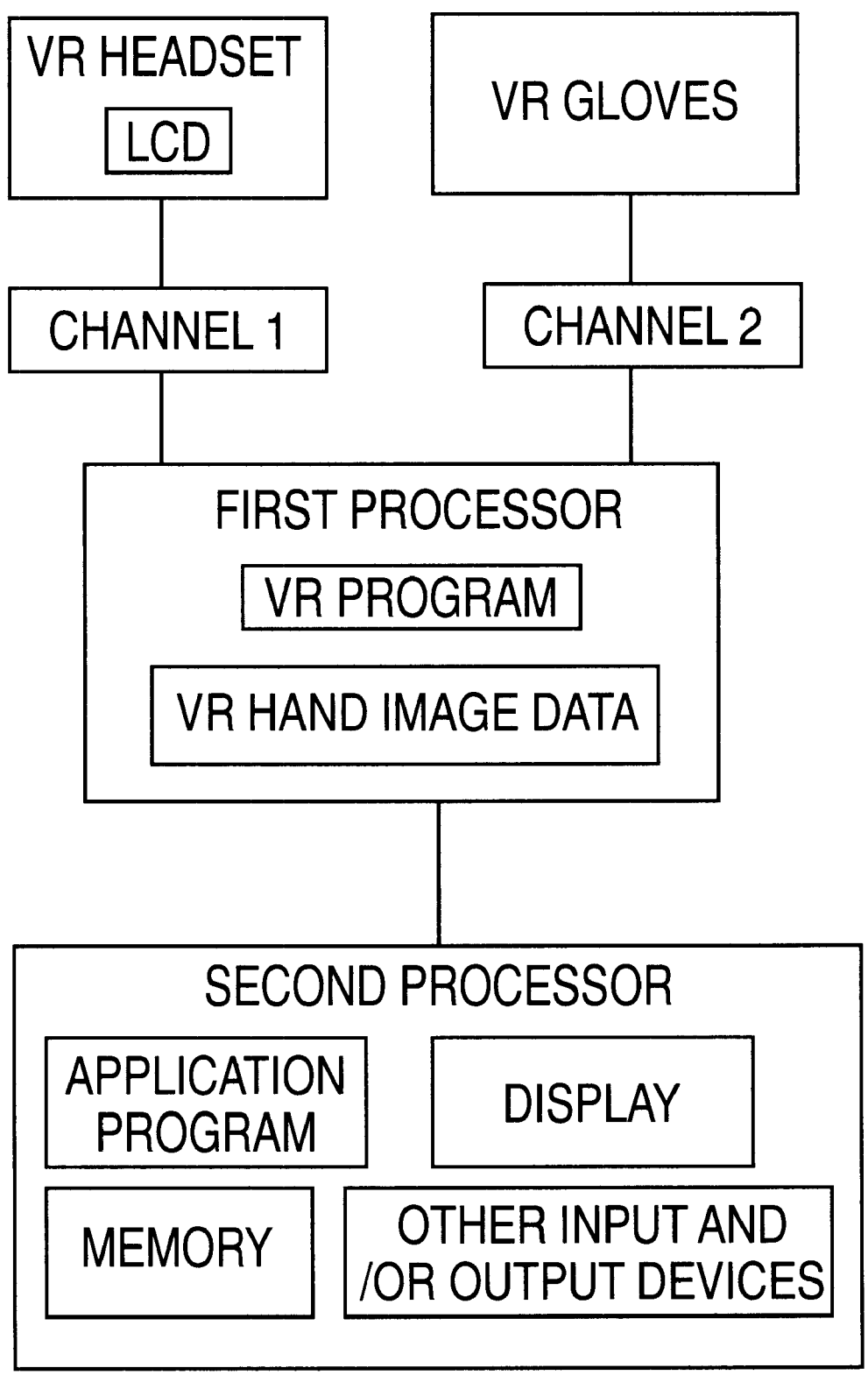
FIG. 43 illustrates a ninth embodiment of the disclosed VR keyboard system and method for displaying VR hand images using the VR keyboard.
Figure 44:
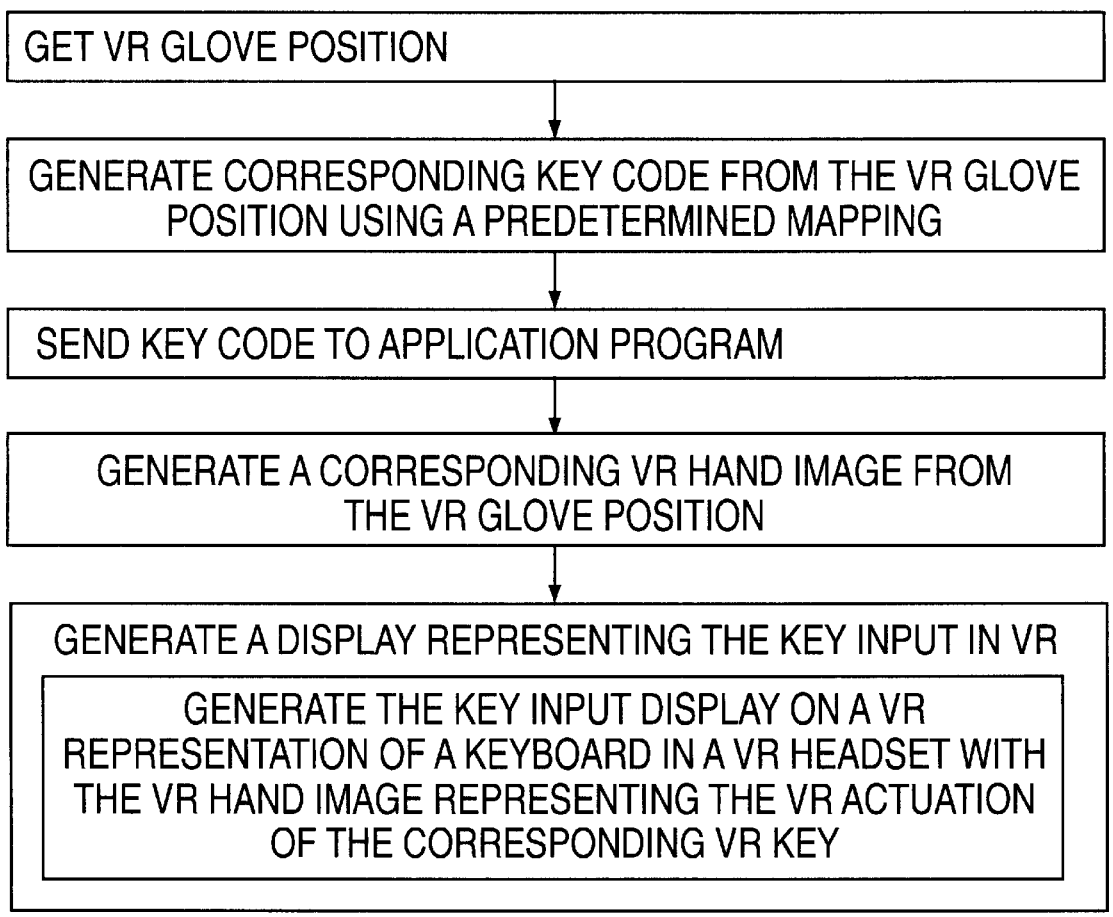
FIG. 44 illustrates a flowchart of the method of operation of the ninth embodiment for displaying a VR hand image.

FIG. 43 illustrates a ninth embodiment of the disclosed VR keyboard system and method for displaying VR hand images using the VR keyboard, in which the first processor uses VR hand image data, which may be stored in a memory of the first processor. FIG. 44 illustrates a flowchart of the method of operation of the ninth embodiment displaying a VR hand image, in which the method gets a VR glove position, generates a corresponding key code from the VR glove position using a predetermined mapping, and sends the key code to the application program. The VR processor then generates a corresponding VR hand image from the VR glove position, with the VR hand image being, for example, a smooth, idealized, and generic image of a hand. The method then generates a display representing the key input in VR, including the step of generating the key input display on a VR representation of a keyboard in the VR headset with the VR hand image representing the VR actuation of the corresponding VR key.

Figure 45:
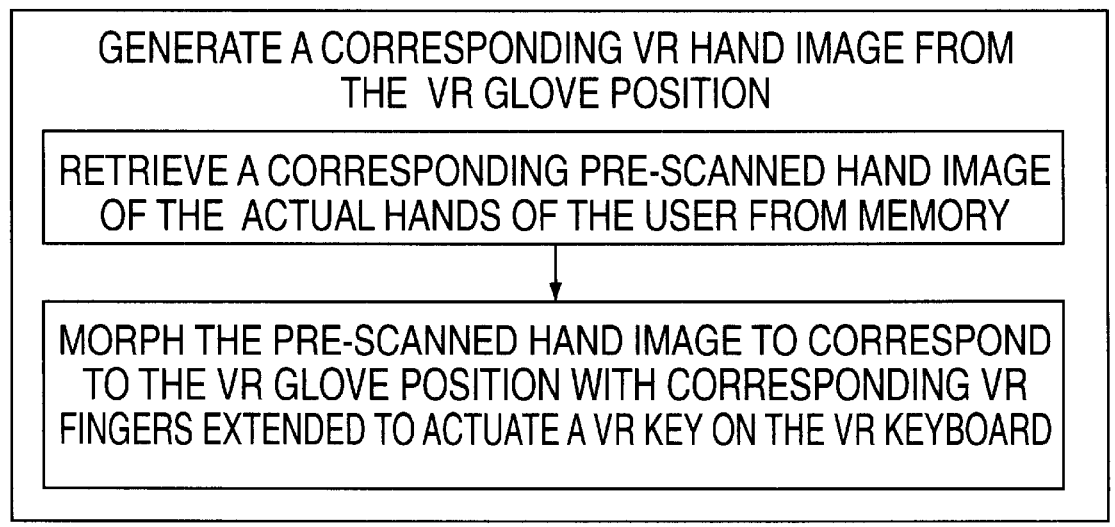
FIG. 45 illustrates a flowchart of a method for generating the VR hand images of the ninth embodiment.

FIG. 45 illustrates a flowchart of a method for generating the VR hand images of the ninth embodiment using, for example, actual hand data from the user. For example, the hands of the user may be pre-scanned and stored in the memory of the disclosed VR keyboard system and method. During use, the pre-scanned hand image of the actual hands of the user is retrieved from the memory, and using morphing techniques, the pre-scanned hand image is morphed to correspond to the VR glove position with corresponding VR fingers extended to actuate a VR key on the VR keyboard. Accordingly, the specific user may experience, by visual cues and views, the actual operation a keyboard with his/her own hands, when in fact the user is operating a VR keyboard. In conjunction with force feedback implementations of the VR gloves, the user may also experience and feel operation of an actual keyboard, when in fact the user is seeing a VR image of his/her own hands, and is feeling a VR actuated tactile response, through the actuators, to pressing VR keys.

Figure 46:
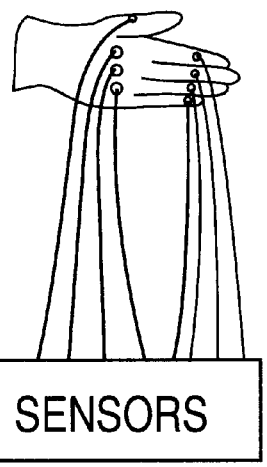
FIG. 46 illustrates a tenth embodiment of the disclosed VR keyboard system and method using sensors to detect hand positions of a user without a VR glove.

FIG. 46 illustrates a tenth embodiment of the disclosed VR keyboard system and method using sensors to detect hand positions of a user without a VR glove. The sensors may include magnets, accelerometers, or other mechanisms for detecting the relative movement of positions of the hand of the user.

Figure 47:
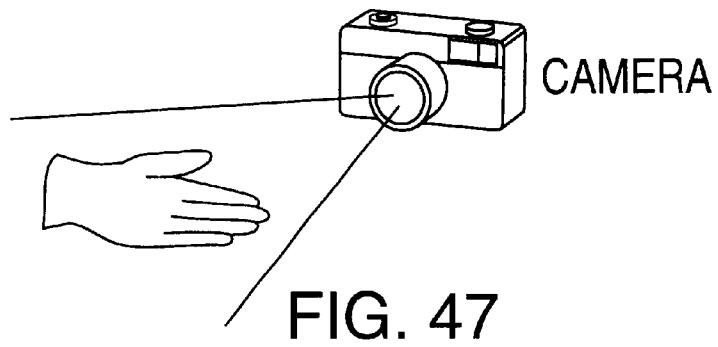
FIG. 47 illustrates an alternative of the tenth embodiment using a camera and machine vision to detect hand positions of a user without a VR glove.

FIG. 47 illustrates an alternative of the tenth embodiment using a camera and machine vision to detect hand positions of a user without a VR glove, with the first processor performing image processing techniques to translate the images from the camera into parameters determining the positions and orientations of the hands and portions thereof. The camera may be an optical/visible light camera, an infrared camera, and/or a camera using any electromagnetic wavelength and/or frequency to generate an image of the hand. Alternatively, the hands of the user may be coated with, preferably, relatively safe chemicals which are readily detectable by a corresponding type of camera. The user may be instructed, for example, by automated instructions, to dab fluorescent chemicals on the tips and knuckles of each finger for detection by a fluorescent-light sensitive camera.

Figure 48:
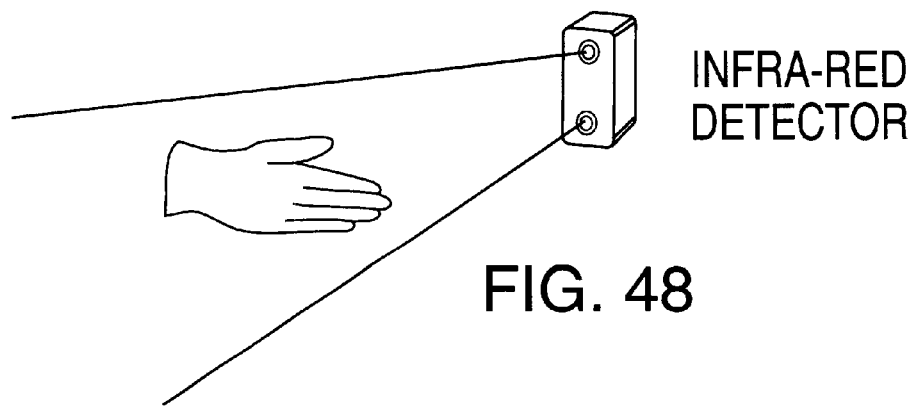
FIG. 48 illustrates another alternative of the tenth embodiment using an infrared detector to detect hand positions of a user without a VR glove.

FIG. 48 illustrates another alternative of the tenth embodiment using an infrared detector to detect hand positions of a user without a VR glove, in which the infrared energy/body heat generated by the hands of the user may be detected and translated into relative positions and orientations of the hand. Other sensor systems may be used, such as Doppler radar, sonar, Doppler sonar and ultrasound to detect the hands of the user.

Figure 49:
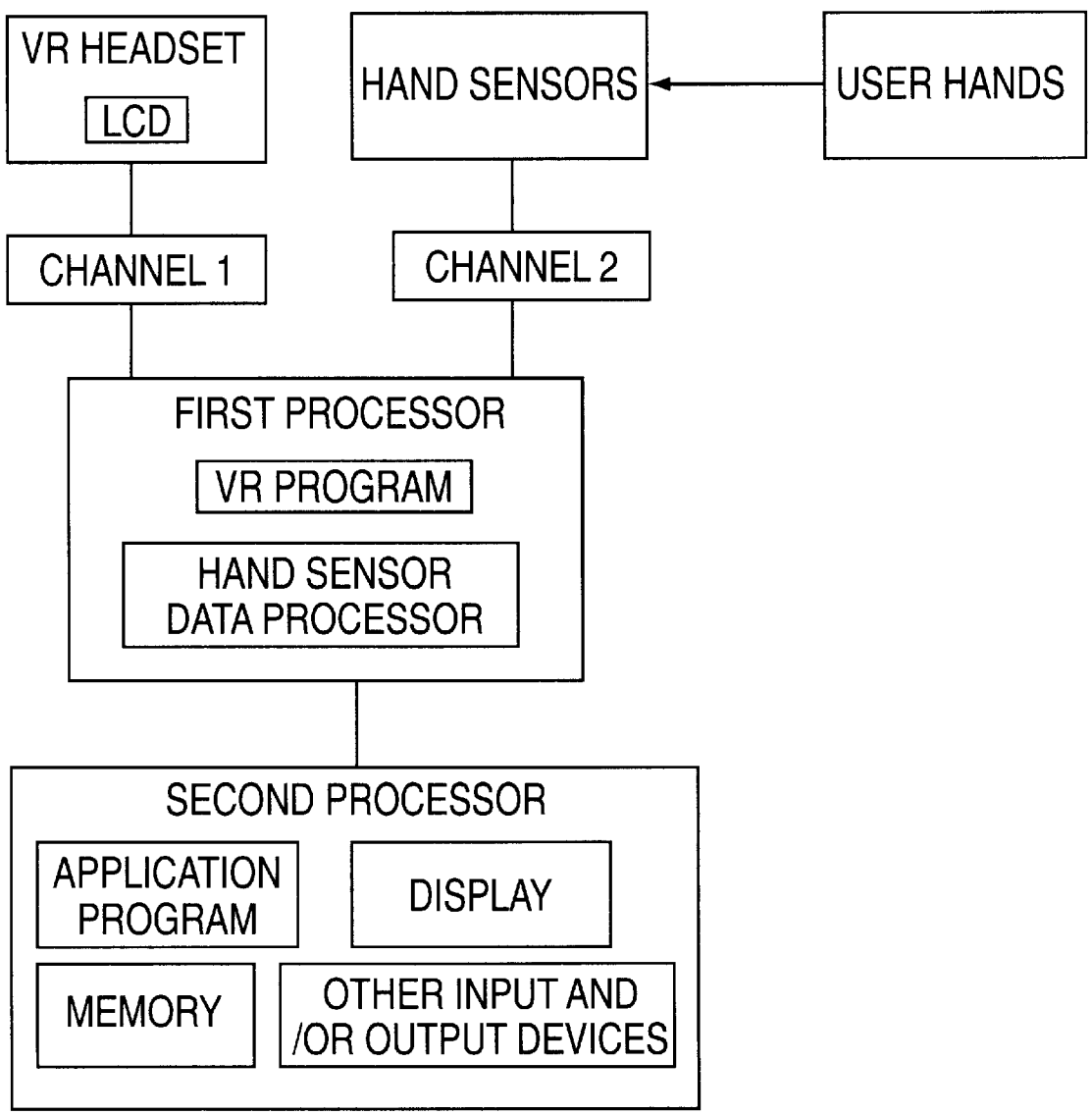
FIG. 49 illustrates a schematic of the tenth embodiment using hand sensors for operating a VR keyboard.

FIG. 49 illustrates a schematic of the tenth embodiment using hand sensors for operating a VR keyboard, in which hand sensor, such as the sensors, cameras, and detectors of FIGS. 46–48, detect the hands of the user. The first processor includes a hand sensor data processor for generating hand positions and orientations, such as (X, Y, Z) coordinates, corresponding to key inputs, as described herein with respect to the mappings, embodiments and implementations using the VR gloves.

Figure 50:
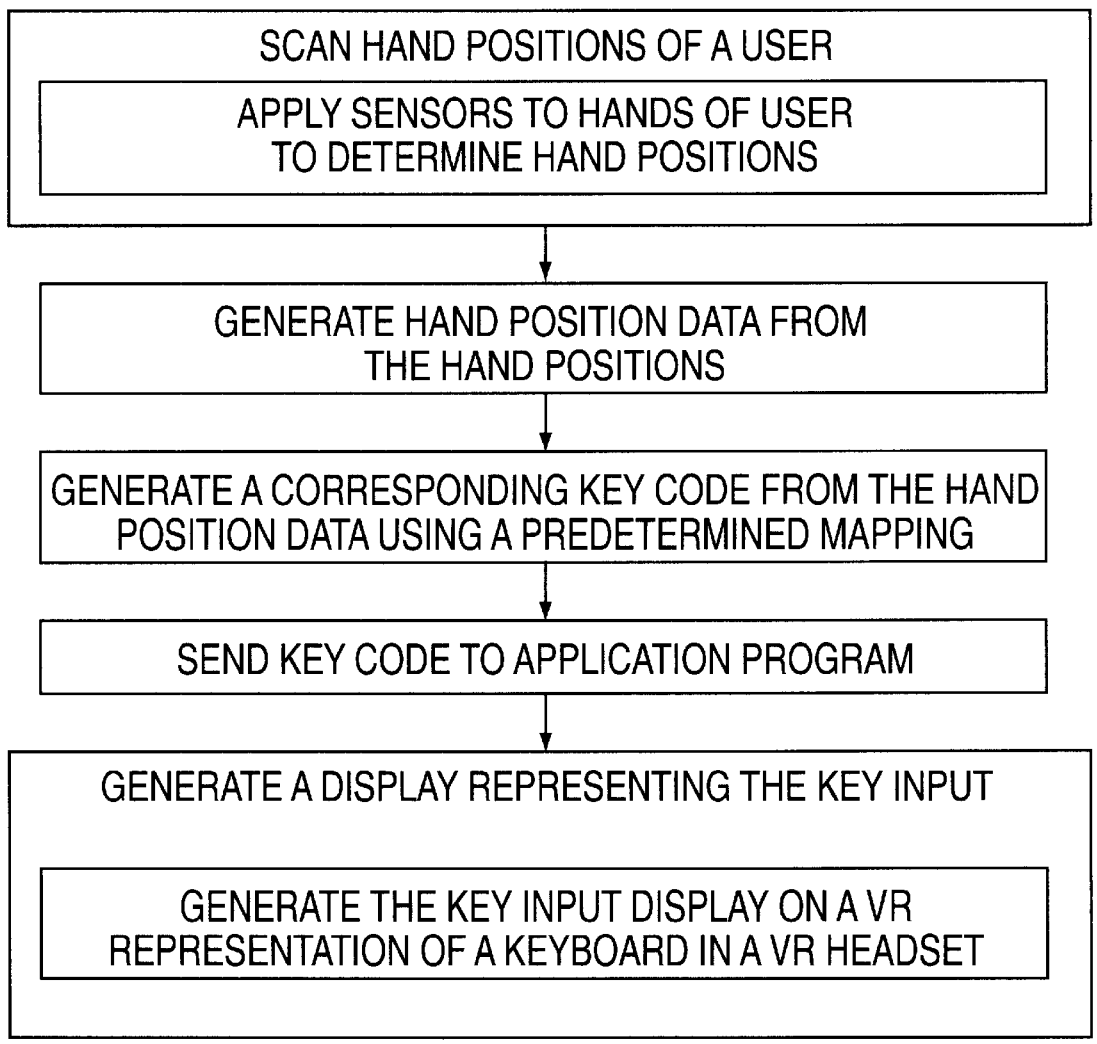
FIG. 50 illustrates a flowchart of the operation of the tenth embodiment for scanning hand positions of the hands of the user to operate the VR keyboard.

FIG. 50 illustrates a flowchart of the operation of the tenth embodiment for scanning hand positions of the hands of user to operate the VR keyboard. The method scans the hand positions of the user, for example, using the hand sensors applied to the hands of the user as in FIG. 46. The method then generates hand position data from the hand positions, for example, in the form of position and orientation vectors (X, Y, Z). The method then determines a key code corresponding to the hand position data using a predetermined mapping. The key code is then sent to the application program and/or second processor, and the method generates the display representing the key input, such as a VR key input on a VR representation in the LCD of the VR headset.

While the disclosed VR keyboard system and method is particularly shown and described herein with reference to the preferred embodiments, it is to be understood that various modifications in form and detail may be made without departing from the scope and spirit of the present invention, such that the present invention encompasses any and all machines, articles of manufacture, compositions of matter, processes, apparatus, systems, devices, computers, structures, components, means, methods, algorithms, techniques, steps, routines, hardware, firmware, software, computer programs, objects in object oriented programming, network implementations, distributed computing implementations, Internet applications, multimedia applications, heterogeneous configurations and systems, terrestrial and extraterrestrial applications, wire-based implementations, wireless-based implementations, fiber-optic-based implementations, nanotechnology-based implementations, cybernetic implementations including human-machine interfaces and interconnections, combinations and hybrid implementations of any and all of the implementations suggested herein, etc., including anything under the sun capable of generating, operating, and/or providing a virtual reality keyboard. Accordingly, modifications such as any examples suggested herein, but not limited thereto, are to be considered within the scope of the present invention.

What is claimed is:

1. A system for implementing a virtual reality (VR) keyboard, the system comprising:

a display device associated with a user, the display device being responsive to first image data for generating and displaying a first image simulating a physical keyboard having a plurality of physical keys and appearing to the user to be in space independent of actual physical objects, with the first image representing the VR keyboard to the user through the display device, with the VR keyboard having a first appearance corresponding to the first image data;

an input device for detecting a motion associated with the user, the input device being responsive to the detected motion for generating motion-representative input signals corresponding to the motion; and a processor connected to the display device and operating a VR-keyboard-generating program for providing the first image data to the display device, the processor being responsive to the motion-representative input signals from the input device, for generating motion image data corresponding to the motion; and wherein the display device is responsive to the motion image data for generating a second image simulating the physical keyboard having the plurality of physical keys to represent the VR keyboard having a second appearance simulating actuation of at least one of the plurality of physical keys corresponding to the motion.

2. The system of claim 1, wherein the input device is responsive to a motion of a finger of the user corresponding to keystrokes to generate the input signals;

wherein the processor, responsive to the keystroke-corresponding input signals, generates finger-motion image data; and wherein the display device is responsive to the finger-motion image data for generating the VR keyboard having the second appearance representing depressed VR keys on the VR keyboard, thereby displaying depressed VR keys in response to VR keystrokes.

3. The system of claim 2, wherein the processor, responsive to the input signals from the input device, generates corresponding input data to be output to external devices with the input data corresponding to the VR keystrokes.

4. The system of claim 3, wherein the input data corresponds to at least one of a command, text, and a graphic user interface signal.

5. The system of claim 3, wherein the external device is a graphic user interface responsive to the input data corresponding to mouse operations and text.

6. The system of claim 1, wherein the processor generates VR world data; and wherein the display device generates a VR world corresponding to the VR world data, with the VR keyboard displayed in the VR world.

7. The system of claim 1, wherein the processor, responsive to a selected mapping chosen from a plurality of predetermined mappings, generates the first image data corresponding to the VR keyboard having VR keys corresponding to the selected mapping; and wherein the display device, responsive to the first image data, displays the VR keyboard having VR keys corresponding to the selected mapping.

8. The system of claim 7, wherein the predetermined mappings include specifications for VR keys, each specification corresponding to a respective language.

9. The system of claim 7, wherein the predetermined mappings include specifications for VR keys corresponding to different pre-defined computer commands.

10. The system of claim 7, wherein the predetermined mappings include specifications for positioning a plurality of keys having different positions on a common keyboard shape.

11. The system of claim 7, wherein the predetermined mappings include specifications for defining different VR keyboard shapes and key orientations displayed in virtual reality.

12. The system of claim 2, wherein the input device includes force-feedback means for selectively generating pressure to the fingers of the user during motion of the fingers;

wherein the processor, responsive to the input data from the input device, controls the force-feedback means.

13. The system of claim 2, wherein the processor includes:

a neural network, responsive to the input signals, for learning a custom three-dimensional orientation of at least one hand and at least one finger of a predetermined user during use of the VR keyboard by the predetermined user; and wherein the processor, responsive to the input signals applied to the trained neural network, predicts the VR keys to be depressed corresponding to the motion of the keystroke-corresponding input signals, and generates the corresponding finger-motion image data.

14. The system of claim 13, wherein the trained neural network, responsive to the input signals, authenticates a current user as the predetermined user.

15. The system of claim 1, wherein the display device includes:

an orientation sensor, responsive to a vertical orientation of the head of the user wearing the display device, for generating an orientation signal; and wherein the processor, responsive to the orientation signal, for generating the first and second image data in response to the vertical orientation being within a predetermined vertical range, and for not generating any of the first and second image data in response to the vertical orientation being outside of the predetermined vertical range.

16. The system of claim 1, further comprising:

a switch for switching input signals to the processor either from the input device or from a physical keyboard.

17. The system of claim 2, the processor generates hand image data corresponding to the motion of the finger; and wherein the display device, responsive to the hand image data, generates images of at least one VR hand having at least one VR finger positioned substantially adjacent to the VR keyboard, with the at least one VR finger appearing to depress the depressed VR keys corresponding to the motion.

18. A system for implementing an interactive virtual reality (VR) keyboard, the system comprising:

a display device associated with a user, with the display device including at least one liquid crystal display (LCD) viewable by the user, with the display device being responsive to first image data for generating and displaying a first image simulating a physical keyboard having a plurality of physical keys and appearing to the user to be in space independent of actual physical objects, with the first image representing the VR keyboard having a plurality of VR keys to the user through the at least one LCD, with the VR keyboard having a first appearance corresponding to the first image data;

an input device for detecting a motion associated with the user corresponding to at least one physical keystroke, the input device being responsive to the detected motion for generating keystroke-corresponding input signals corresponding to the motion;

a processor connected to the display device and operating a VR-keyboard-generating program for providing the first image data to the display device, the processor being responsive to the keystroke-corresponding input signals for generating finger-motion image data; and wherein the display device is responsive to the finger-motion image data for generating a second image simulating the physical keyboard having the plurality of physical keys to represent the VR keyboard having a second appearance representing a depressed VR key on the VR keyboard simulating actuation of at least one of the plurality of physical keys, thereby displaying at least one depressed VR key in response to the at least one physical keystroke.

19. A method for providing an interactive virtual reality (VR) keyboard, the method comprising the steps of:

operating a VR keyboard-generating-program using a processor;

outputting first image data to a display device;

displaying with a display device a first image simulating a physical keyboard with a plurality of physical keys and appearing to the user to be in space independent of actual physical objects, with the first image representing the VR keyboard having a plurality of VR keys on the display to the user, with the VR keyboard having a first appearance corresponding to the first image data;

detecting motion at an input device, with the motion associated with the user corresponding to at least one physical keystroke;

generating keystroke-corresponding input signals at the input device corresponding to the detected motion;

generating finger-motion image data using the processor corresponding to the input signals; and generating, using the finger-motion data, a second image simulating the physical keyboard having the plurality of physical keys to represent the VR keyboard viewable by the display device, with the VR keyboard having a second appearance representing a depressed VR key on the VR keyboard simulating actuation of at least one of the plurality of physical keys, thereby displaying at least one depressed VR key in response to the at least one physical keystroke.

20. The method of claim 19, wherein the step of displaying the VR keyboard using the display device to the user includes the step of:

displaying a selected keyboard image from a plurality of keyboard images.

* * * * *